United States Patent
Liu et al.

(10) Patent No.: US 12,180,356 B2
(45) Date of Patent: *Dec. 31, 2024

(54) PROPYLENE-ETHYLENE COPOLYMERS AND ADHESIVES CONTAINING PROPYLENE-ETHYLENE COPOLYMERS

(71) Applicant: Synthomer Adhesive Technologies LLC, Beachwood, OH (US)

(72) Inventors: Jianning Liu, Johnson City, TN (US); Marc Stacey Somers, Kilgore, TX (US); Bennett Haines Novak, Longview, TX (US); Raymond Prescott Cottle, Longview, TX (US); Bee Kim Liew, Katy, TX (US); Andrea Gail Hagood, Kingsport, TN (US); Terri Roxanne Carvagno, Kingsport, TN (US)

(73) Assignee: Synthomer Adhesive Technologies LLC, Beachwood, OH (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/873,904

(22) Filed: Jul. 26, 2022

(65) Prior Publication Data
US 2024/0034869 A1 Feb. 1, 2024

(51) Int. Cl.
*C08L 23/16* (2006.01)
*C08L 91/06* (2006.01)

(52) U.S. Cl.
CPC .............. *C08L 23/16* (2013.01); *C08L 91/06* (2013.01); *C08L 2205/02* (2013.01)

(58) Field of Classification Search
CPC ........ C08L 23/16; C08L 2205/02; C09J 91/06
See application file for complete search history.

(56) References Cited

U.S. PATENT DOCUMENTS

| | | |
|---|---|---|
| 4,859,757 A | 8/1989 | Pellon et al. |
| 5,714,554 A | 2/1998 | Sustic et al. |
| 8,536,268 B2 | 9/2013 | Karjala et al. |

(Continued)

FOREIGN PATENT DOCUMENTS

WO 2018088359 5/2018

OTHER PUBLICATIONS

PCT Search Report and Written Opinion dated Oct. 4, 2023 for related PCT Patent Application No. PCT/US2023/068357, 10 pages.

*Primary Examiner* — Ling Siu Cho
*Assistant Examiner* — Andrea Wu
(74) *Attorney, Agent, or Firm* — Hovey Williams LLP; Kameron D. Kelly

(57) ABSTRACT

Propylene-ethylene copolymers are provided that exhibit superior tensile strength and mechanical properties due to their specific propylene and ethylene content, triad tacticity, viscosity, and crystallinity. Moreover, we have discovered that certain processing conditions, such as polymerization temperature and external donor to catalyst ratios, can facilitate the production of the high tensile strength propylene-ethylene copolymers described herein. Furthermore, the high tensile strength propylene-ethylene copolymers may be used to produce a variety of hot melt adhesives, such as those for hygiene applications, woodworking applications, lamination applications, and packaging applications, which exhibit unique and superior mechanical properties.

25 Claims, 7 Drawing Sheets

(56) References Cited

U.S. PATENT DOCUMENTS

| | | |
|---|---|---|
| 2003/0204017 A1 | 10/2003 | Stevens et al. |
| 2004/0249046 A1* | 12/2004 | Abhari .................. C09J 123/10 525/223 |
| 2006/0128897 A1 | 6/2006 | Datta et al. |
| 2007/0134506 A1 | 6/2007 | Chasey et al. |
| 2013/0060215 A1 | 3/2013 | Knutson et al. |
| 2015/0225622 A1* | 8/2015 | Somers .................. C08L 53/02 526/128 |
| 2018/0340059 A1 | 11/2018 | Abubakar et al. |
| 2019/0171143 A1 | 6/2019 | Somers et al. |
| 2020/0248046 A1 | 8/2020 | Ge et al. |

* cited by examiner

PROPYLENE-ETHYLENE COPOLYMERS AND ADHESIVES CONTAINING PROPYLENE-ETHYLENE COPOLYMERS

BACKGROUND

1. Field of the Invention

The present invention is generally related to propylene-ethylene copolymers and adhesives containing such copolymers. In particular but not exclusively, the present invention is generally related to propylene-ethylene copolymers that exhibit superior tensile properties and adhesives containing such copolymers.

2. Description of the Related Art

Generally, hot melt adhesives contain more than one polyolefin polymer because most polyolefin polymers exhibit one or more characteristics, such as low viscosity and/or low cohesive strength, which render them unsuitable for use by themselves when forming adhesives. Thus, most hot melt adhesives require a blend of low viscosity polyolefin polymers and high viscosity polyolefin polymers to meet certain performance criteria for the adhesive's intended application and to meet the viscosity window for adhesive sprayability.

Due to the deficiencies of existing polyolefin polymers, some manufacturers have attempted to modify the propylene and ethylene content of the polyolefin polymers to thereby form polymers exhibiting specific ratios of needle penetration and softening point. However, despite the improvement associated with such polymers, these polymers generally do not exhibit the necessary tensile strength and mechanical properties to be utilized by themselves, without the need for a secondary polymer, when forming adhesive compositions. These secondary polymers containing higher tensile and mechanical properties typically also have higher ring and ball softening point temperatures and higher viscosities that make the adhesives slower and more energy intensive to melt and more difficult to process. Additionally, when higher tensile polyolefin polymers are utilized, the high initial adhesive strength generally decreases unacceptably with ageing, especially in hygiene applications, such as diaper adhesives.

Thus, there is still need for polyolefin polymers that exhibit desirable tensile strength and manageable processing properties for use in adhesive compositions. Additionally, there is a need for polyolefin polymers with desirable tensile and adhesive strength that do not decrease unacceptably with ageing.

SUMMARY

One or more aspects of the present disclosure generally concern a propylene-ethylene copolymer comprising propylene and ethylene. Furthermore, the propylene-ethylene copolymer: (a) comprises 77 to 90 weight percent of propylene; (b) comprises a triad tacticity (mm %) of 52% to 75%; (c) exhibits a Ring and Ball softening point of 90° C. to 135° C.; (d) has a Brookfield viscosity at 190° C. of 7,000 to 15,000 cP; and (e) exhibits a tensile strength at break of at least 2 MPa.

In reference to the propylene-ethylene copolymer disclosed above, one or more aspects of the present disclosure generally concern an adhesive comprising the above-referenced propylene-ethylene copolymer. As noted above, the propylene-ethylene copolymer: (a) comprises 77 to 90 weight percent of propylene; (b) comprises a triad tacticity (mm %) of 52% to 75%; (c) exhibits a Ring and Ball softening point of 90° C. to 135° C.; (d) has a Brookfield viscosity at 190° C. of 7,000 to 15,000 cP; and (e) exhibits a tensile strength at break of at least 2 MPa. Furthermore, the adhesive comprises: (a) 5 to 100 weight percent of the propylene-ethylene copolymer; (b) 0 to 55 weight percent of at least one second polymer; (c) not more than 70 weight percent of at least one tackifier; (d) not more than 20 weight percent of a processing oil; and (e) not more than 35 weight percent of at least one wax.

The following statements refer to various aspects of the present disclosure. The following statements regarding aspects may be combined in any combination or may be separately applicable to the associated aspect (e.g., one of the following limitations may be applicable to the first aspect, while another limitation may not be applicable to the first aspect).

According to a first aspect of the disclosure, there is provided propylene-ethylene copolymer comprising propylene and ethylene, wherein the propylene-ethylene copolymer:
(a) comprises 77 to 90 weight percent of propylene;
(b) comprises a triad tacticity (mm %) of 52% to 75%;
(c) has a Brookfield viscosity at 190° C. of at least 4,000 cP;
(d) exhibits a Ring and Ball softening point of 90 to 155° C.; and
(e) exhibits a tensile strength at break of at least 2.5 MPa.

In relation to the first aspect, the propylene-ethylene copolymer may comprise 10 to 23 weight percent of ethylene.

Additionally or alternatively, the triad tacticity of the propylene-ethylene copolymer is 53% to 70%.

Additionally or alternatively, the propylene-ethylene copolymer has a Brookfield viscosity at 190° C. of 4,000 to 88,000 cP.

Additionally or alternatively, the propylene-ethylene copolymer exhibits a heat of crystallization of 15 to 42 J/g and a heat of fusion of 9 to 33 J/g.

Additionally or alternatively, the propylene-ethylene copolymer exhibits a Ring and Ball softening point of 100 to 135° C. and a needle penetration of 2 to 24 dmm.

Additionally or alternatively, the propylene-ethylene copolymer exhibits an elongation at break of 100% to 1,000% and a tensile strength at break of 2.5 to 20 MPa.

Additionally or alternatively, the propylene-ethylene copolymer may comprise less than 1 weight percent of a $C_4$-$C_{10}$ alpha-olefin.

According to a second aspect of the disclosure either alone or in combination with the first aspect, the propylene-ethylene copolymer—
(i) comprises 10 to 23 weight percent of ethylene,
(ii) has a triad tacticity (mm %) of 53% to 70%,
(iii) has a Brookfield viscosity at 190° C. of 4,000 to 88,000 cP,
(iv) exhibits a tensile strength at break of 2.5 to 20 MPa, and
(v) exhibits a needle penetration of 3 to 23 dmm.

According to a third aspect of the disclosure either alone or in combination with the first and second aspects, the propylene-ethylene copolymer—
(a) comprises 77 to 90 weight percent of propylene,
(b) has a triad tacticity (mm %) of 52% to 75%,
(c) has a Ring and Ball softening point of 95° C. to 125° C., (d) has a Brookfield viscosity at 190° C. of 2,000 to 7,000 cP, and
(e) exhibits—
  (i) a tensile strength at break of at least 4 MPa, or
  (ii) a tensile strength at break of at least 4 MPa and an elongation at break of at least 100%.

According to a fourth aspect of the disclosure, there is provided propylene-ethylene copolymer comprising propylene and ethylene, wherein the propylene-ethylene copolymer:
  (a) comprises 77 to 90 weight percent of propylene;
  (b) comprises a triad tacticity (mm %) of 52% to 75%;
  (c) has a Brookfield viscosity at 190° C. of 7,000 to 15,000 cP;
  (d) exhibits a Ring and Ball softening point of 90 to 135° C.; and
  (e) exhibits a tensile strength at break of at least 2 MPa.

According to a fifth aspect of the disclosure, there is provided propylene-ethylene copolymer comprising propylene and ethylene, wherein the propylene-ethylene copolymer:
  (a) comprises 77 to less than 89 weight percent of propylene;
  (b) comprises a triad tacticity (mm %) of 52% to 75%;
  (c) has a Brookfield viscosity at 190° C. of greater than 15,000 cP and less than 88,000 cP;
  (d) exhibits a Ring and Ball softening point of 100° C. to 155° C.; and
  (e) exhibits a tensile strength at break of at least 2.5 MPa.

According to a sixth aspect of the disclosure, there is provided a composition comprising the propylene-ethylene copolymer as discussed in the first through fifth aspects, and additions and alternatives relating to those aspects.

According to a seventh aspect of the disclosure, there is provided a method for producing the propylene-ethylene copolymer of the first through fifth aspects and additions or alternatives relating to those aspects, wherein the method comprises polymerizing ethylene and propylene at a temperature equal to or less than 160° C., wherein the polymerizing occurs in presence of a catalyst system that has a molar ratio of aluminum to titanium in the range of 1:1 to 100:1.

According to an eighth aspect of the disclosure, there is provided a composition comprising:
  (a) 5 to 100 weight percent of the propylene-ethylene copolymer, wherein the propylene-ethylene copolymer—
    (i) comprises 77 to 90 weight percent of propylene,
    (ii) comprises a triad tacticity (mm %) of 52% to 75%,
    (iii) has a Brookfield viscosity at 190° C. of at least 4,000 cP,
    (iv) exhibits a Ring and Ball softening point of 90 to 135° C., and
    (v) exhibits a tensile strength at break of at least 2.5 MPa;
  (b) 0 to 55 weight percent of at least one second polymer;
  (c) not more than 70 weight percent of at least one tackifier;
  (d) not more than 20 weight percent of a processing oil; and
  (e) not more than 35 weight percent of at least one wax.

In relation to the eighth aspect, the propylene-ethylene copolymer may comprise 10 to 23 weight percent of ethylene.

Additionally or alternatively, the triad tacticity of the propylene-ethylene copolymer is 53% to 70%.

Additionally or alternatively, the propylene-ethylene copolymer has a Brookfield viscosity at 190° C. of 4,000 to 88,000 cP.

Additionally or alternatively, the propylene-ethylene copolymer exhibits a heat of crystallization of 15 to 42 J/g and a heat of fusion of 9 to 33 J/g.

Additionally or alternatively, the propylene-ethylene copolymer exhibits a Ring and Ball softening point of 100 to 135° C. and a needle penetration of 2 to 24 dmm.

Additionally or alternatively, the propylene-ethylene copolymer exhibits an elongation at break of 100% to 1,000% and a tensile strength at break of 2.5 to 20 MPa.

Additionally or alternatively, the composition comprises 20 to 80 weight percent of the propylene-ethylene copolymer.

Additionally or alternatively, the composition comprises:
  (a) 25 to 45 weight percent of the propylene-ethylene copolymer;
  (b) 0 to 15 weight percent of the second polymer;
  (c) 45 to 50 weight percent of the tackifier;
  (d) 0 to 15 weight percent of the processing oil; and
  (e) 0 to 10 weight percent of the wax.

Additionally or alternatively, the composition has a Brookfield viscosity at 190° C. in the range of 500 to 20,000 cP.

According to a ninth aspect of the disclosure, there is provided a composition comprising:
  (a) 5 to 100 weight percent of the propylene-ethylene copolymer, wherein the propylene-ethylene copolymer—
    (i) comprises 77 to 90 weight percent of propylene,
    (ii) comprises a triad tacticity (mm %) of 52% to 75%,
    (iii) exhibits a Ring and Ball softening point of 90° C. to 135° C.,
    (iii) has a Brookfield viscosity at 190° C. of 7,000 cP to 15,000 cP, and
    (iv) exhibits a tensile strength at break of at least 2 MPa;
  (b) 0 to 55 weight percent of at least one second polymer;
  (c) not more than 70 weight percent of at least one tackifier;
  (d) not more than 20 weight percent of a processing oil; and
  (e) not more than 35 weight percent of at least one wax.

In relation to the ninth aspect, the composition comprises:
  (a) 35 to 50 weight percent of the propylene-ethylene copolymer;
  (b) 0 to 15 weight percent of the second polymer;
  (c) 35 to 50 weight percent of the tackifier;
  (d) 0 to 15 weight percent of the processing oil; and
  (e) 0 to 10 weight percent of the wax.

Additionally or alternatively, the composition comprises:
  (a) 35 to 55 weight percent of the propylene-ethylene copolymer;
  (b) 35 to 55 weight percent of the tackifier;
  (c) 0 to 15 weight percent of the processing oil; and
  (d) 0 to 7 weight percent of the wax.

Additionally or alternatively, the composition has a Brookfield viscosity at 150° C. in the range of 1,000 to 4,000 cP.

Additionally or alternatively, the composition exhibits a peel strength after 24 hours of aging that is at least 80 percent of an initial peel strength of the composition.

According to a tenth aspect of the disclosure, there is provided a composition comprising:
(a) 30 to 45 weight percent of the propylene-ethylene copolymer, wherein the propylene-ethylene copolymer—
  (i) comprises 77 to 90 weight percent of propylene,
  (ii) comprises a triad tacticity (mm %) of 52% to 75%,
  (iii) exhibits a Ring and Ball softening point of 90° C. to 135° C.,
  (iii) has a Brookfield viscosity at 190° C. of 7,000 cP to 15,000 cP, and
  (iv) exhibits a tensile strength at break of at least 2 MPa;
(b) 0 to 15 weight percent of the second polymer;
(c) 40 to 50 weight percent of the tackifier;
(d) 0 to 20 weight percent of the processing oil; and
(e) 0 to 10 weight percent of the wax.

In relation to the tenth aspect, the composition has a Brookfield viscosity at 150° C. in the range of 1,000 to 5,000 cP.

Additionally or alternatively, the composition exhibits a peel strength after 24 hours of aging that is at least 80 percent of an initial peel strength of the composition.

According to an eleventh aspect of the disclosure, there is provided a composition comprising:
(a) 5 to 100 weight percent of the propylene-ethylene copolymer, wherein the propylene-ethylene copolymer—
  (i) comprises at least 77 and less than 89 weight percent of propylene,
  (ii) comprises a triad tacticity (mm %) of 52% to 75%,
  (iii) exhibits a Ring and Ball softening point of 100° C. to 155° C.,
  (iii) has a Brookfield viscosity at 190° C. of greater than 15,000 cP and less than 88,000 cP, and
  (iv) exhibits a tensile strength at break of at least 2.5 MPa;
(b) 0 to 55 weight percent of at least one second polymer;
(c) not more than 70 weight percent of at least one tackifier;
(d) not more than 20 weight percent of a processing oil; and
(e) not more than 35 weight percent of at least one wax.

In relation to the eleventh aspect, the composition comprises:
(a) 30 to 45 weight percent of the propylene-ethylene copolymer;
(b) 0 to 15 weight percent of the second polymer;
(c) 40 to 50 weight percent of the tackifier;
(d) 10 to 20 weight percent of the processing oil; and
(e) 0 to 10 weight percent of the wax.

In relation to the eleventh aspect, the composition has a Brookfield viscosity at 150° C. in the range of 1,000 to 5,000 cP.

Additionally or alternatively, the composition has a Brookfield viscosity at 190° C. in the range of 1,000 to 20,000 cP.

Additionally or alternatively, the composition exhibits a peel strength after 24 hours of aging that is at least 80 percent of an initial peel strength of the composition.

According to a twelfth aspect of the disclosure, there is provided an article comprising the propylene-ethylene copolymers of the first to fifth aspects and/or the compositions of the sixth and/or eighth to eleventh aspects, wherein the article is selected from the group consisting of adhesives, sealants, caulks, roofing membranes, waterproof membranes and underlayments, carpet, laminates, laminated articles, tapes, labels, mastics, polymer blends, wire coatings, molded articles, heat seal coatings, disposable hygiene articles, insulating glass (IG) units, bridge decking, electronic housings, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, book bindings, candles, windows, tires, films, gaskets, seals, o-rings, motor vehicles, motor bicycles, motor vehicle molded parts, motor vehicle extruded parts, clothing articles, rubber additive/processing aids, and fibers; and wherein when the article is an adhesive, the adhesive is a packaging adhesive, food contact grade adhesive, indirect food contact packaging adhesives, product assembly adhesive, woodworking adhesive, edge banding adhesive, profile wrapping adhesive, flooring adhesives, automotive assembly adhesive, structural adhesive, flexible laminating adhesive, rigid laminating adhesives, flexible film adhesive, flexible packaging adhesive, home repair adhesive, industrial adhesive, construction adhesive, furniture adhesive, mattress adhesive, pressure sensitive adhesive (PSA), PSA tape, PSA label, PSA protective film, self-adhesive film, laminating adhesive, flexible packaging adhesive, heat seal adhesive, industrial adhesive, hygiene nonwoven construction adhesive, hygiene core integrity adhesives, or hygiene elastic attachment adhesive.

BRIEF DESCRIPTION OF THE FIGURES

Embodiments of the present invention are described herein with reference to the following drawing figures, wherein.

DETAILED DESCRIPTION

Figure 1:
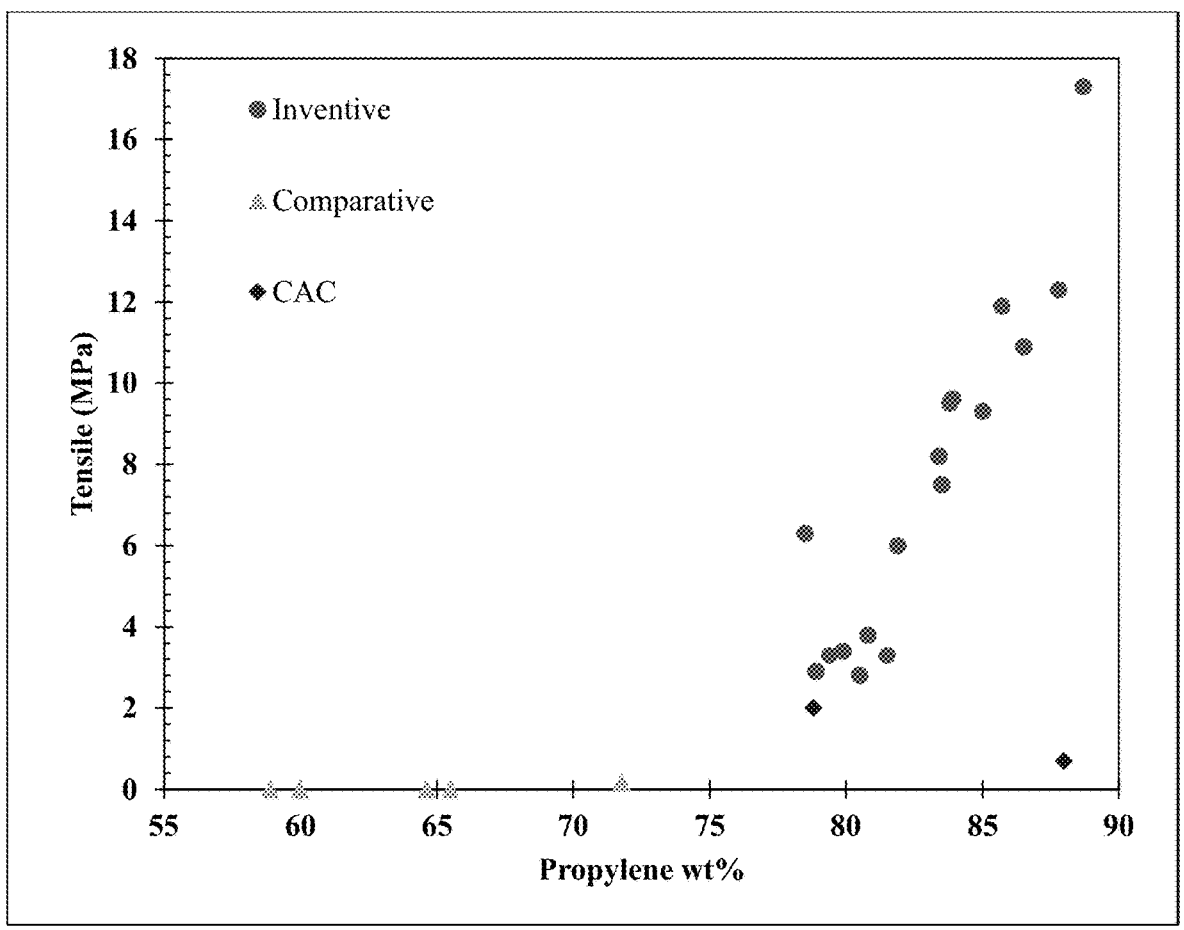
FIG. 1 is a graph comparing the propylene contents and the tensile strengths of the copolymers in Example 1.

We have discovered that propylene-ethylene copolymers having a specific propylene and ethylene content and, triad tacticity, combined with other features such as viscosity and crystallinity, may exhibit superior tensile strength and mechanical properties. Moreover, we have discovered that certain processing conditions, such as polymerization temperature and external donor to catalyst ratios, can facilitate the production of the inventive propylene-ethylene copolymers described herein. Furthermore, we have discovered that these superior tensile strength propylene-ethylene copolymers may be used to produce a variety of compositions including adhesives, such as those for hygiene applications, woodworking applications, lamination applications, and packaging applications, which exhibit unique and superior mechanical properties (e.g., superior peel strength and peel strength after ageing).

It is known that the viscosity of a polymer is proportional to the molecular weight raised to the 3.4 power ($M^{3.4}$) for entangled polymer melts. It is also known that the mechanical strength of a polymer increases with molecular weight as the long polymer chains become entangled and increase the strength of the bulk polymer. As a result, polymers of similar monomer composition and viscosity (molecular weight) have similar tensile strength. We discovered that the tensile strength and elongation at break of the inventive propylene-ethylene copolymers were unexpectedly high at a given propylene content and viscosity.

More particularly, we have discovered that the triad tacticity of the propylene-ethylene copolymers can be important in controlling the tensile strength, elongation at break, crystallinity, needle penetration, and adhesive aging properties. Furthermore, we have discovered that the triad tacticity must be selectively controlled along with the ethylene content of the inventive copolymers, as the crystal defects caused by the ethylene content also influence these key physical properties. Moreover, as discussed below in greater detail, we have discovered that the polymerization temperature and external donor to catalyst ratios can be effective methods to control the triad tacticity of the resulting propylene-ethylene copolymers.

Furthermore, we have discovered that the inventive propylene-ethylene copolymers were able to be used as the only polymer or as the primary polymer when producing desirable adhesives. We have discovered that adhesive formulations containing the inventive propylene-ethylene copolymers may exhibit desirable softening points and viscosities, which allowed the adhesives to be sprayed at 150° C. Moreover, such adhesives were able to demonstrate stable or increasing peel strength after ageing 24 hours, 4 hours (38° C.), two weeks (55° C.), and one month (25° C.).

The critical characteristics of the inventive propylene-ethylene copolymers are described below in greater detail. It should be noted that, while most of the following characteristics and properties of the inventive propylene-ethylene copolymers and adhesives may be listed separately, it is envisioned that each of the following characteristics and/or properties of the copolymers and adhesives are not mutually exclusive and may be combined and present in any combination, unless such a combination creates a contradiction (e.g., incompatible weight percent ranges).

According to various embodiments, the propylene-ethylene copolymers described herein can comprise varying amounts of ethylene. In an embodiment or in combination with any embodiment mentioned herein, the propylene-ethylene copolymers can comprise at least 0.5, 1, 2, 3, 4, 5, 6, 7, 8, 9, 10, 11, 12, 13, 14, 15, 16, 17, or 18 weight percent of ethylene, based on the total weight of the copolymer. Additionally, or in the alternative, the propylene-ethylene copolymers can comprise less than 30, 29, 28, 27, 26, 25, 24, 23, 22, 21, 20, 19, or 18 weight percent of ethylene, based on the total weight of the copolymer.

In an embodiment or in combination with any embodiment mentioned herein, the propylene-ethylene copolymers can comprise in the range of 0.5 to 30, 0.5 to 25, 0.5 to 23, 0.5 to 21, 0.5 to 18, 5 to 30, 5 to 25, 5 to 23, 5 to 21, 5 to 18, 8 to 30, 8 to 25, 8 to 23, 8 to 21, 8 to 18, 10 to 30, 10 to 25, 10 to 23, 10 to 21, 10 to 18, 15 to 30, 15 to 25, 15 to 23, 15 to 21, 15 to 18, 18 to 30, 18 to 25, 18 to 23, or 18 to 21 weight percent of ethylene, based on the total weight of the copolymer.

Furthermore, in various embodiments, the propylene-ethylene copolymers can contain varying amounts of propylene. In an embodiment or in combination with any embodiment mentioned herein, the propylene-ethylene copolymers can comprise at least 72, 75, 77, 78, 79, 80, 81, or 82 weight percent of propylene, based on the total weight of the copolymer. Additionally, or in the alternative, the propylene-ethylene copolymers can comprise less than 90, 89, 88, 87, 86, 85, 84, 83, or 82 weight percent of propylene, based on the total weight of the copolymer.

In an embodiment or in combination with any embodiment mentioned herein, the propylene-ethylene copolymers can comprise in the range of 72 to 90, 72 to 89, 72 to 88, 77 to 90, 77 to 89, 77 to 88, 77 to 86, 77 to 84, 77 to 82, 79 to 90, 79 to 89, 79 to 88, 79 to 86, 79 to 84, 79 to 82, 82 to 90, 82 to 89, or 82 to 88 weight percent of propylene, based on the total weight of the copolymer.

The ethylene and propylene contents of the copolymers was determined by NMR via the technique described in *Macromolecules* 2000, 33, 1157-1162 by Wang et al., which is incorporated herein by reference in its entirety.

In an embodiment or in combination with any embodiment mentioned herein, the propylene-ethylene copolymers can contain one or more $C_4$-$C_{10}$ alpha-olefins. Generally, $C_4$-$C_{10}$ alpha-olefins can be used to increase the resulting bond strength of the copolymers when utilized in adhesives. These $C_4$-$C_{10}$ alpha-olefins can include, for example, 1-butene, 1-pentene, 1-hexene, 1-heptene, 1-octene, 1-nonene, 1-decene, and combinations thereof.

In an embodiment or in combination with any embodiment mentioned herein, the propylene-ethylene copolymers can comprise not more than 10, 8, 5, 3, 2, 1, 0.5, or 0.1 weight percent of at least one $C_4$-$C_{10}$ alpha-olefin, based on the total weight of the copolymer. Moreover, in various embodiments, the copolymers can comprise in the range of 0.5 to 10, 1 to 10, 2 to 10, 3 to 10, 4 to 10, or 5 to 10 weight percent of at least one $C_4$-$C_{10}$ alpha-olefin, based on the total weight of the copolymer.

In certain embodiments, the propylene-ethylene copolymers may not contain any $C_4$-$C_{10}$ alpha-olefins.

In an embodiment or in combination with any embodiment mentioned herein, the propylene-ethylene copolymer may have a triad tacticity of at least or greater than 52, 53, 54, 55, 56, 57, 58, 59, 60, or 61 mm content %. Additionally, or the alternative, the propylene-ethylene copolymer may have a triad tacticity of less than 75, 74, 73, 72, 71, 70, 69, 68, 67, 66, 65, 64, 63, 62, 61, or 60 mm content %.

In an embodiment or in combination with any embodiment mentioned herein, the propylene-ethylene copolymer may have a triad tacticity in the range of 52 to 75, 52 to 74, 52 to 70, 52 to 65, 52 to 60, 53 to 75, 53 to 74, 53 to 70, 53 to 65, 53 to 60, 54 to 75, 54 to 74, 54 to 70, 54 to 67, 54 to 66, 54 to 65, 54 to 60, 55 to 75, 55 to 74, 55 to 70, 55 to 65, 55 to 60, 58 to 75, 58 to 74, 58 to 70, 58 to 68, 60 to 75, 60 to 74, 60 to 70, 60 to 68, 61 to 75, 61 to 74, 61 to 70, or 61 to 68 mm content %.

The formula for measuring triad tacticity may be found in U.S. Pat. No. 5,504,172 and the article by Tsutsui et al. (Polymer 1989, 30, 1350-1356), both of which are incorporated by reference in their entireties. The triad tacticity of a polymer is the relative tacticity of a sequence of three adjacent propylene units, a chain consisting of head to tail bonds, expressed as a binary combination of meso (m) and racemic (r) sequences. The triad tacticity expressed herein as "mm" is determined by 13C nuclear magnetic resonance (NMR) and the following formula:

$$mm \text{ Fraction} = \frac{PPP(mm)}{PPP(mm) + PPP(mr) + PPP(rr)} \quad \text{(Equation 1)}$$

where PPP(mm), PPP(mr), and PPP(rr) denote peak areas derived from the methyl groups on a propylene sequence relative to next corresponding propylene sequences methyl group orientations as shown by chemical shifts below:
PPP(mm)=21.3-22.0 ppm;
PPP(mr)=20.6-21.3 ppm; and
PPP(rr)=18.0-22.5 ppm.

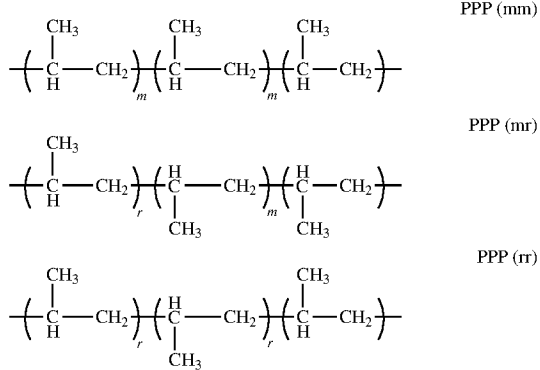

In an embodiment or in combination with any embodiment mentioned herein, the propylene-ethylene copolymer can have a Brookfield viscosity at 190° C. of at least 2,000, 3,000, 4,000, 5,000, 6,000, 7,000, 8,000, 9,000, 10,000, 11,000 12,000, 13,000, 14,000, 15,000, 16,000, 20,000, 25,000, 27,000, 30,000, 35,000, 40,000, 45,000, 50,000, 55,000, 60,000, 65,000, 70,000, 78,000, 80,000, 85,000, 90,000 cP. Additionally, or in the alternative, the propylene-ethylene copolymers can have a Brookfield viscosity at 190° C. of less than 120,000, 110,000, 100,000, 90,000, 88,000, 80,000, 70,000, 60,000, 50,000, 40,000, 35,000, 30,000, 27,000, 26,000, 25,000, 20,000, 18,000, 17,000, 16,000, 15,000, 14,000, 13,000, 12,000, 11,000, 10,000, 7,000, 6,000, 5,000, 4,000, 3,000, or 2,000 cP, as measured according to ASTM D-3236.

In an embodiment or in combination with any embodiment mentioned herein, the propylene-ethylene copolymers can have a higher Brookfield viscosity at 190° C. in the range of 4,000 to 88,000, 15,000 to 88,000, 15,000 to 60,000, 15,000 to 26,000, 27,000 to 40,000, 27,000 to 35,000, 27,000 to 30,000, 15,000 to 26,000, 4,000 to 60,000, or 27,000 to 120,000 cP, as measured according to ASTM D-3236. Additionally, or in the alternative, the propylene-ethylene copolymers can have a higher Brookfield viscosity at 190° C. of greater than 15,000 cP and less than 88,000 cP.

In an embodiment or in combination with any embodiment mentioned herein, the propylene-ethylene copolymer can have an intermediate Brookfield viscosity at 190° C. in the range of 7,000 to 15,000, 7,000 to 14,000, 7,000 to 13,000, or 7,000 to 12,000 cP, as measured according to ASTM D-3236.

In an embodiment or in combination with any embodiment mentioned herein, the propylene-ethylene copolymer can have a low Brookfield viscosity at 190° C. in the range of 2,000 to 7,000, 3,000 to 7,000, 4,000 to 7,000, 4,000 to 27,000, 7,000 to 12,000, or 4,000 to 6,000 cP, as measured according to ASTM D-3236.

In an embodiment or in combination with any embodiment mentioned herein, the propylene-ethylene copolymer can have a Peak Tm of at least 70, 72, 74, 75, 76, 78, 80, 82, 84, 85, 86, 88, or 90° C. Additionally, or in the alternative, the propylene-ethylene copolymer can have a Peak Tm of less than 121, 120, 118, 116, 114, 112, 110, 108, 106, 104, 102, 100, 98, 96, 94, 92, 90, 89, 88, 87, 86, or 85° C. The Peak Tm may be measured in accordance with procedure outlined in "DSC as Problem Solving Tool: Measurement of Percent Crystallinity of Thermoplastics" by Sichina et al., which is incorporated herein by reference in its entirety. The Peak Tm refers to the assigned temperature that the DSC software identifies as the integration peak of the melt transition from the Tm endotherm.

In an embodiment or in combination with any embodiment mentioned herein, the propylene-ethylene copolymer can have a Peak Tm in the range of 70 to 90° C., 70 to 89° C., 70 to 88° C., 70 to 87° C., 70 to 86° C., 70 to 85° C., 74 to 85° C., 85 to 121° C., or 90 to 110° C.

Generally, the softening points of the propylene-ethylene copolymers may be modified and optimized by managing the comonomer content, the triad tacticity, the crystallinity, and the viscosity of the propylene-ethylene copolymers. Lower softening points for the copolymers can be desirable so that the copolymers can be utilized and processed at lower application temperatures. In an embodiment or in combination with any embodiment mentioned herein, the propylene-ethylene copolymers can exhibit a Ring and Ball softening point of at least 90° C., 94° C., 95° C., 100° C., 105° C., 110° C., 113° C., or 115° C. as measured according to ASTM E28 Standard Test Method for Softening Point of Resins Derived from Pine Chemicals and Hydrocarbons, by Ring-and Ball Apparatus using a heating rate of 5° C. per minute and a bath liquid of USP Glycerin. Additionally, or in the alternative, the propylene-ethylene copolymers can exhibit a Ring and Ball softening point of less than 160° C., 155° C., 150° C., 145° C., 140° C., 138° C., 135° C., 134° C., 133° C., 130° C., 125° C., 120° C., 117° C., 115° C., or 110° C., as measured according to ASTM E28 Standard Test Method for Softening Point of Resins Derived from Pine Chemicals and Hydrocarbons, by Ring-and Ball Apparatus using a heating rate of 5° C. per minute and a bath liquid of USP Glycerin.

In an embodiment or in combination with any embodiment mentioned herein, the propylene-ethylene copolymers can exhibit a Ring and Ball softening point ranging from 90 to 155° C., 90 to 135° C., 94 to 154° C., 94 to 110° C., 94 to 135° C., 95 to 155° C., 95 to 135° C., 95 to 125° C., 105 to 155° C., 105 to 140° C., 100 to 135° C., 100 to 134° C., 100 to 133° C., 100 to 130° C., 100 to 125° C., 100 to 120° C., 100 to 117° C., 100 to 110° C., 105 to 120° C., or 113 to 138° C., as measured according to ASTM E28 Standard Test Method for Softening Point of Resins Derived from Pine Chemicals and Hydrocarbons, by Ring-and Ball Apparatus using a heating rate of 5° C. per minute and a bath liquid of USP Glycerin.

Generally, the needle penetration of the propylene-ethylene copolymers may be modified and optimized by managing the comonomer content, the triad tacticity, the crystallinity, and the viscosity of the propylene-ethylene copolymers. In an embodiment or in combination with any embodiment mentioned herein, the propylene-ethylene copolymers can have a needle penetration of at least 1, 2, 3, 4, 5, 6, 7, 8, 9, 10, 11, 12, 13, 14, 15, 16, or 17 decimillimeters ("dmm") as measured according to ASTM D5. Additionally, or in the alternative, the propylene-ethylene copolymers can have a needle penetration of less than 35, 30, 26, 25, 23, 22, 21, 20, 19, 18, 17, 16, 15, 14, 13, 12, or 11 dmm as measured according to ASTM D5 Standard Test Method for Penetration of Bituminous Materials.

In an embodiment or in combination with any embodiment mentioned herein, the propylene-ethylene copolymers can have a needle penetration in the range of 2 to 26 dmm, 2 to 23 dmm, 3 to 23 dmm, 3 to 20 dmm, 5 to 23 dmm, 6 to 23 dmm, 10 to 23 dmm, 13 to 23 dmm, 6 to 22 dmm, 15 to 21 dmm, 17 to 22 dmm, 2 to 17 dmm, 2 to 15 dmm, 2 to 13 dmm, or 2 to 11 dmm.

Generally, the tensile strength at break of the propylene-ethylene copolymers may be modified and optimized by managing the comonomer content, the triad tacticity, the crystallinity, and the viscosity, of the propylene-ethylene copolymers. In an embodiment or in combination with any embodiment mentioned herein, the propylene-ethylene copolymers can exhibit a tensile strength at break of at least 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 MPa, as measured according to ASTM D412 Standard Test Methods for Vulcanized Rubber and Thermoplastic Elastomers—Tension. Additionally, or in the alternative, the propylene-ethylene copolymers can exhibit a tensile strength at break of less than 20, 19, 18, 17, 16, 15, 14, 13, 12, 11, 10, 9, 8, 7, 6, 5, 4, 3, 2.5, or 2 MPa, as measured according to ASTM D412. In an embodiment or in combination with any embodiment mentioned herein, the propylene-ethylene copolymers can exhibit a tensile strength at break in the range of 2 to 20 MPa, 2 to 17 MPa, 2 to 15 MPa, 2 to 12 MPa, 2 to 10 MPa, 2 to 9 MPa, 2 to 8 MPa, 2 to 6 MPa, 2 to 4 MPa, 2 to 3 MPa, 2 to 2.3 MPa, 2.5 to 20 MPa, 2.5 to 17 MPa, 2.5 to 15 MPa, 2.5 to 12 MPa, 2.5 to 10 MPa, 2.5 to 9 MPa, 2.5 to 8 MPa, 2.6 to 20 MPa, 2.6 to 17 MPa, 2.6 to 15 MPa, 2.6 to 12 MPa, 2.6 to 10 MPa, 2.6 to 9 MPa, 2.6 to 8 MPa, 2.8 to 20 MPa, 2.8 to 17 MPa, 2.8 to 15 MPa, 2.8 to 12 MPa, 2.8 to 10 MPa, 2.8 to 9 MPa, 2.8 to 8 MPa, 3 to 20 MPa, 3 to 17 MPa, 3 to 15 MPa, 3 to 12 MPa, 3 to 10 MPa, 3 to 9 MPa, 3.5 to 20 MPa, 3.5 to 17 MPa, 3.5 to 15 MPa, 3.5 to 12 MPa, 3.5 to 10 MPa, 3.5 to 9 MPa, 3.5 to 8 MPa, 4 to 20 MPa, 4 to 15 MPa, 4 to 12 MPa, 4 to 10 MPa, 4 to 9 MPa, 4 to 8 MPa, or 4 to 6 MPa, as measured according to ASTM D412.

Generally, the elongation at break of the propylene-ethylene copolymers may be modified and optimized by managing the comonomer content, the triad tacticity, the crystallinity, and the viscosity of the propylene-ethylene copolymers. In an embodiment or in combination with any embodiment mentioned herein, the propylene-ethylene copolymers can exhibit an elongation at break of at least 70, 100, 150, 200, 250, 300, 350, 400, 450, 500, 550, or 600%, as measured according to ASTM D412. Additionally, or in the alternative, the propylene-ethylene copolymers can exhibit an elongation at break of less than 1,000, 900, 800, 700, 600, or 500%, as measured according to ASTM D412.

In an embodiment or in combination with any embodiment mentioned herein, the propylene-ethylene copolymers can exhibit an elongation at break in the range of 70 to 1,000%, 70 to 800%, 70 to 500%, 100 to 1,000%, 100 to 800%, 200 to 1,000%, 200 to 800%, 300 to 1,000%, 300 to 800%, 450 to 1,000%, 450 to 800%, 500 to 1,000%, or 500 to 800%, as measured according to ASTM D412.

In an embodiment or in combination with any embodiment mentioned herein, the propylene-ethylene copolymers can exhibit a heat of crystallization ($H_c$, 20° C./min cooling rate) of at least 10, 11, 12, 13, 14, 15, 16, 17, 18, 19, 20, 21, 22, or 23 J/g. Additionally, or in the alternative, the propylene-ethylene copolymers can exhibit a heat of crystallization ($H_c$, 20° C./min cooling rate) of less than 50, 45, 42, 40, 38, 36, 34, 33, 32, 31, 30, 29, 28, 27, 26, 25, 24, 23, 22, 21, 20, 19, or 18 J/g. For example, the propylene-ethylene copolymers can exhibit a heat of crystallization ($H_c$, 20° C./min cooling rate) in the range of 15 to 42, 15 to 33, 15 to 25, 15 to 24, 15 to 23, 15 to 22, 15 to 21, 15 to 20, 15 to 19, 15 to 18, 16 to 36, 16 to 33, 16 to 29, 16 to 22, 16 to 21, 16 to 20, 20 to 30, 20 to 28, 20 to 26, 23 to 42, or 24 to 29 J/g.

In an embodiment or in combination with any embodiment mentioned herein, the propylene-ethylene copolymers can exhibit a heat of fusion ($H_f$, 20° C./min heating rate) of at least 8, 9, 10, 11, 12, 13, or 14 J/g and/or less than 40, 35, 33, 30, 29, 28, 26, 24, 23, 22, 21, 20, 19, 18, 17, 16, 15, 14, or 13.5 J/g. For example, the propylene-ethylene copolymers can exhibit a heat of fusion ($H_f$, 20° C./min heating rate) in the range of 8 to 40, 8 to 35, 9 to 33, 9 to 20, 9 to 18, 9 to 16, 9 to 15, 9 to 14, 10 to 29, 10 to 21, 11 to 29, 11 to 19, 11 to 16, 11 to 15, 11 to 14, 12 to 33, or 13 to 20 J/g.

Additionally, the propylene-ethylene copolymers described herein can be amorphous or semi-crystalline. As used herein, "amorphous" means that the copolymers have a crystallinity of less than 5 percent as measured using Differential Scanning calorimetry ("DSC") according to ASTM E 794-85. As used herein, "semi-crystalline" means that the copolymers have a crystallinity in the range of 5 to 40 percent as measured using DSC at 20° C./min scan rate, according to ASTM E 794-85. In an embodiment or in combination with any embodiment mentioned herein, the copolymers can have a crystallinity of at least 1, 2, 3, 4, 5, 6, 7, 8, 9, 10, 11, 12, 13, 14, 15, 16, 17, 18, 19, or 20 percent, as measured using DSC according to ASTM E 794-85. Additionally, or in the alternative, the copolymers can have a crystallinity of less than 60, 50, 45, 40, 35, 30, 25, 24, 23, or 22 percent, as measured using DSC according to ASTM E 794-85. For example, the copolymers can have a crystallinity in the range of 2 to 50, 3 to 46, 4 to 40, 4 to 30, 4 to 20, 16 to 25, 16 to 23, 17 to 25, 17 to 23, 20 to 35, or 20 to 30 percent, as measured using DSC according to ASTM E 794-85.

In an embodiment or in combination with any embodiment mentioned herein, the propylene-ethylene copolymers do not exhibit substantial changes in color when subjected to storage conditions at elevated temperatures over extended periods of time. Before any aging due to storage occurs, the inventive copolymers can have an initial Gardner color of less than 4, 3, 2, or 1 as measured according to ASTM D1544. Additionally, or in the alternative, after being heat aged at 177° C. for at least 96 hours, the inventive copolymers can exhibit a final Gardner color of less than 7, 5, 3, or 2 as measured according to ASTM D1544. Thus, the inventive copolymers can retain a desirable color even after prolonged storage and exposure.

In an embodiment or in combination with any embodiment mentioned herein, the propylene-ethylene copolymers can comprise in the range of 8 to 25 weight percent of ethylene, based on the total weight of the copolymer, can have a triad tacticity in the range of 55 to 70 mm %, can have a tensile strength at break in the range of 0.9 to 10 MPa as measured according to ASTM D412, and can have a ring and ball softening point in the range of 100° C. to 135° C. as measured according to ASTM E28, and a viscosity between 15,000 and 30,000 cP at 190° C. as measured according to ASTM D-3236.

An exemplary propylene-ethylene copolymer composition that has a high viscosity and exhibits high tensile strength and high elongation for use in various adhesives, such as woodworking adhesives, is provided below in TABLE 1A. As shown below, TABLE 1A provides broad, intermediate, and narrow ranges for various characteristics of these high viscosity propylene-ethylene copolymers, and these ranges may be combined in any combination regardless of their category (e.g., one or more broad ranges may be combined with one or more intermediate and/or narrow ranges). Furthermore, although broad, intermediate, and narrow ranges are provided in TABLE 1A, it is envisioned that any of the ranges described above regarding the general propylene-ethylene copolymers may be applicable to the copolymer composition provided in TABLE 1A, unless such a range creates a contradiction.

TABLE 1A

|  | Broad | Intermediate | Narrow |
| --- | --- | --- | --- |
| Viscosity, cP @ 190° C. | 2,000 to 90,000 | 4,000 to 88,000 | 4,000 to 60,000 |
| Needle Penetration (dmm) | 2 to 27 | 2 to 22 | 3 to 23 |
| Softening Point (° C.) | 94 to 155 | 100 to 155 | 100 to 135 |
| Propylene (Weight %) | 77 to 90 | 77 to 89 | 79 to 88 |
| Ethylene (Weight %) | 10 to 23 | 11 to 23 | 12 to 21 |
| $C_4$-$C_{10}$ alpha-olefin (Weight %) | Less than 5 | Less than 1 | 0 |
| Triad Tacticity (mm content %) | 52 to 75 | 53 to 70 | 53 to 67 |
| Tensile Strength at Break (MPa) | 2.5 to 20 | 3.5 to 20 | 4 to 20 |
| Elongation at Break (%) | 100 to 1,000 | 200 to 1,000 | 300 to 1,000 |
| Peak Tm (° C.) | 70 to 121 | 85 to 121 | 90 to 110 |
| Heat of Crystallization ($H_c$) (J/g) | 15 to 42 | 20 to 36 | 16 to 36 |
| Heat of Fusion ($H_f$) (J/g) | 10 to 33 | 10 to 30 | 10 to 29 |

An exemplary propylene-ethylene copolymer composition for use in various adhesives, such as laminating and woodworking adhesives, which has a high viscosity and exhibits a medium tensile strength, is provided below in TABLE 1B. As shown below, TABLE 1B provides broad, intermediate, and narrow ranges for various characteristics of these high viscosity propylene-ethylene copolymers, which may be combined in any combination regardless of their category (e.g., one or more broad ranges may be combined with one or more intermediate and/or narrow ranges). Furthermore, although broad, intermediate, and narrow ranges are provided in TABLE 1B, it is envisioned that any of the ranges described above regarding the general propylene-ethylene copolymers may be applicable to the copolymer composition provided in TABLE 1B, unless such range creates a contradiction.

TABLE 1B

|  | Broad | Intermediate | Narrow |
| --- | --- | --- | --- |
| Viscosity, cP @ 190° C. | 4,000 to 88,000 | 4,000 to 80,000 | 15,000 to 60,000 |
| Needle Penetration (dmm) | 2 to 23 | 2 to 21 | 3 to 20 |
| Softening Point (° C.) | 94 to 155 | 105 to 155 | 105 to 140 |
| Propylene (Weight %) | 77 to 90 | 77 to 89 | 79 to 88 |
| Ethylene (Weight %) | 10 to 23 | 11 to 23 | 12 to 21 |
| $C_4$-$C_{10}$ alpha-olefin (Weight %) | Less than 5 | Less than 1 | 0 |
| Triad Tacticity (mm content %) | 52 to 75 | 53 to 70 | 54 to 65 |
| Tensile Strength at Break (MPa) | 2.5 to 20 | 3 to 20 | 4 to 20 |
| Elongation at Break %) | 100 to 1,000 | 300 to 1,000 | 500 to 1,000 |
| Peak Tm (° C.) | 70 to 121 | 80 to 120 | 84 to 120 |
| Heat of Crystallization ($H_c$) (J/g) | 15 to 42 | 15 to 36 | 16 to 36 |
| Heat of Fusion ($H_f$) (J/g) | 10 to 33 | 10 to 30 | 10 to 29 |

An exemplary propylene-ethylene copolymer composition for use in various adhesives, such as hygiene adhesives, which has a medium viscosity and exhibits a medium tensile strength, is provided below in TABLE 1C. As shown below, TABLE 1C provides broad, intermediate, and narrow ranges for various characteristics of these medium viscosity propylene-ethylene copolymers, which may be combined in any combination regardless of their category (e.g., one or more broad ranges may be combined with one or more intermediate and/or narrow ranges). Furthermore, although broad, intermediate, and narrow ranges are provided in TABLE 1C, it is envisioned that any of the ranges described above regarding the general propylene-ethylene copolymers may be applicable to the copolymer composition provided in TABLE 1C, unless such range creates a contradiction.

TABLE 1C

|  | Broad | Intermediate | Narrow |
| --- | --- | --- | --- |
| Viscosity, cP @ 190° C. | 7,000 to 25,000 | 7,000 to 15,000 | 7,000 to 12,000 |
| Needle Penetration (dmm) | 2 to 24 | 4 to 23 | 5 to 23 |
| Softening Point (° C.) | 90 to 135 | 100 to 135 | 100 to 125 |
| Propylene (Weight %) | 77 to 90 | 77 to 89 | 79 to 88 |
| Ethylene (Weight %) | 10 to 23 | 11 to 23 | 12 to 22 |
| $C_4$-$C_{10}$ alpha-olefin (Weight %) | Less than 5 | Less than 1 | 0 |
| Triad Tacticity (mm content %) | 52 to 75 | 53 to 70 | 54 to 66 |
| Tensile Strength at Break (MPa) | 2 to 20 | 2 to 15 | 2 to 12 |
| Elongation at Break (%) | 100 to 1,000 | 200 to 1,000 | 300 to 1,000 |
| Peak Tm (° C.) | 70 to 90 | 70 to 87 | 74 to 85 |
| Heat of Crystallization ($H_c$) (J/g) | 15 to 42 | 16 to 33 | 16 to 29 |
| Heat of Fusion ($H_f$) (J/g) | 9 to 33 | 9 to 21 | 10 to 21 |

An exemplary propylene-ethylene copolymer composition for use in various adhesives, such as packaging and hygiene adhesives, which has a low viscosity and exhibits a medium tensile strength, is provided below in TABLE 1D. As shown below, TABLE 1D provides broad, intermediate, and narrow ranges for various characteristics of these low viscosity propylene-ethylene copolymers, which may be combined in any combination regardless of their category (e.g., one or more broad ranges may be combined with one or more intermediate and/or narrow ranges). Furthermore, although broad, intermediate, and narrow ranges are provided in TABLE 1D, it is envisioned that any of the ranges described above regarding the general propylene-ethylene copolymers may be applicable to the copolymer composition provided in TABLE 1D, unless such range creates a contradiction.

Processes for Producing the Propylene-Ethylene Copolymers

As discussed above, the present disclosure pertains to a group of propylene-ethylene copolymers that exhibit desirable tensile properties at processable viscosities and moderate ring and ball softening points, and, therefore, may be utilized in a variety of adhesives. While not wishing to be bound by theory, it is believed that these unique tensile properties and ring and ball softening points are obtainable due to a combination of several different copolymer characteristics, such as the propylene/ethylene contents of the copolymers, the triad tacticity content (mm %) of the copolymers, the crystallinity of the copolymers, and the viscosity of the copolymers. Additionally, it has been observed that certain process conditions may also facilitate the production of the inventive copolymers described herein. As discussed below, it has been observed that certain reaction conditions (e.g., polymerization temperatures) and catalyst system components (e.g., external donor to catalyst ratio) can greatly affect the resulting propylene-ethylene copolymers.

The propylene-ethylene copolymers can be produced by reacting propylene monomers and ethylene monomers in the presence of a catalyst system comprising at least one electron donor.

In an embodiment or in combination with any embodiment mentioned herein, the catalyst system can comprise a Ziegler-Natta catalyst. Generally, the Ziegler-Natta catalyst can contain a titanium-containing component, an aluminum

TABLE 1D

|  | Broad | Intermediate | Narrow |
| --- | --- | --- | --- |
| Viscosity, cP @ 190° C. | 2,000 to 7,000 | 3,000 to 7,000 | 4,000 to 7,000 |
| Needle Penetration (dmm) | 2 to 28 | 4 to 28 | 6 to 22 |
| Softening Point (° C.) | 90 to 135 | 100 to 135 | 100 to 125 |
| Propylene (Weight %) | 77 to 90 | 77 to 89 | 79 to 88 |
| Ethylene (Weight %) | 10 to 23 | 11 to 23 | 12 to 21 |
| $C_4$-$C_{10}$ alpha-olefin (Weight %) | Less than 5 | Less than 1 | 0 |
| Triad Tacticity (mm content %) | 52 to 75 | 53 to 70 | 54 to 68 |
| Tensile Strength at Break (MPa) | 2 to 20 | 2 to 12 | 4 to 9 |
| Elongation at Break (%) | 70 to 1,000 | 100 to 1,000 | 100 to 500 |
| Peak Tm (° C.) | 70 to 90 | 70 to 87 | 74 to 85 |
| Heat of Crystallization ($H_c$) (J/g) | 15 to 42 | 16 to 35 | 16 to 33 |
| Heat of Fusion ($H_f$) (J/g) | 10 to 33 | 10 to 20 | 11 to 19 | component, and an electron donor. In certain embodiments, the catalyst comprises titanium chloride on a magnesium chloride support.

In an embodiment or in combination with any embodiment mentioned herein, the catalyst systems can comprise a heterogeneous-supported catalyst system formed from titanium compounds in combination with organoaluminum co-catalysts. Generally, the co-catalyst can comprise an alkyl aluminum co-catalyst, such as triethyl aluminum ("TEAL").

In an embodiment or in combination with any embodiment mentioned herein, the catalyst system can have an aluminum to titanium molar ratio of at least 1:1, 2:1, 3:1, 4:1, 5:1, 6:1, 7:1, 8:1, 9:1, 10:1, or 15:1 and/or not more than 100:1, 50:1, 35:1, or 25:1. Additionally, or in the alternative, the catalyst system can have an aluminum to titanium molar ratio in the range of 1:1 to 100:1, 5:1 to 50:1, 10:1 to 35:1, or 15:1 to 25:1.

In an embodiment or in combination with any embodiment mentioned herein, the catalyst system can have a molar ratio of aluminum to silicon of at least 0.1:1, 0.5:1, 1:1, 2:1, 3:1, 4:1, 5:1, or 6:1 and/or not more than 100:1, 50:1, 35:1, 20:1, 15:1, 10:1, or 8:1. Additionally, or in the alternative, the catalyst system can have a molar ratio of aluminum to silicon in the range of 0.5:1 to 100:1, 1:1 to 50:1, 2:1 to 35:1, 2:1 to 20:1, 2:1 to 15:1, 2:1 to 10:1, or 2:1 to 8:1.

Generally, electron donors can increase the copolymer's stereospecificity. However, it can be important to closely regulate the contents of the electron donors since they can suppress catalyst activity to unacceptable levels in some circumstances. The electron donors used during the polymerization process can include, for example, organic esters, ethers, alcohols, amines, ketones, phenols, phosphines, and/or organosilanes. Furthermore, the catalyst system can comprise internal donors and/or external donors.

There have been numerous generations of internal donors for Ziegler-Natta Catalyst systems, as defined in "Stereo-specific α-Olefin Polymerization with Heterogeneous Catalysts," by J. Severn and R. L. Jones Jr, Handbook of Transition Metal Polymerization Catalysts, (2018) Chapter 9, p 229-312, herein incorporated by reference in its entirety. The Ziegler-Natta catalysts may be broken up into multiple generations, which are described below in greater detail.

Ziegler-Natta Catalyst Generation 3 (Benzoate): The third generation catalysts commonly comprise $MgCl_2$, $TiCl_4$, and an internal electron donor that are combined with an aluminum alkyl cocatalyst, such as $Al(CH_2CH_3)_3$. An external electron donor can be added to the catalyst system. The internal donor in third-generation catalysts is typically ethyl benzoate, which is used in combination with a second aromatic ester, such as methyl p-toluate or ethyl p-ethoxybenzoate (PEEB), as an external donor. An external donor is required since a large proportion of the internal donor is lost as a result of a reaction involving the co-catalyst, such as alkylation and/or complexation reactions. To a large extent, the external donor replaces the internal donor in the solid catalyst, maintaining high catalyst stereospecificity.

Ziegler-Natta Catalyst Generation 4 (Phthalate): The fourth generation catalysts comprise $MgCl_2$, $TiCl_4$, and an internal electron donor that are combined with an aluminum alkyl cocatalyst, such as $Al(CH_2CH_3)_3$. An external electron donor can be added to the catalyst system The internal donor in fourth generation catalysts is phthalate/alkoxysilane-based. It was found that bidentate phthalate donors may form strong chelating complexes with tetracoordinate Mg atoms on the (110) face of $MgCl_2$ or binuclear complexes with two pentacoordinate Mg atoms on the (100) face.

Ziegler-Natta Catalyst Generation 5 (Diethers and Succinates): It was found that certain diether compounds, in particular 2,2-disubstituted-1,3-dimethoxypropanes with an oxygen-oxygen distance in the range 2.8-3.2 Å, similar to those of the alkoxysilane external donors, are not extracted when the catalyst is brought into contact with a $Al(CH_2CH_3)_3$ cocatalyst. As a result of this, high stereospecificity can be obtained even in the absence of an external donor for fifth generation diether catalyst systems. Fifth generation diether catalyst systems can show particularly high polymerization activity and good stability. They also give relatively narrow molecular weight distribution (MWD) and show high sensitivity to hydrogen. Lately, new types of internal donor compounds based on aliphatic dicarboxylic esters, such as malonates and glutarates, and in particular succinates and polyol esters, have been employed. An alkoxysilane is often used as external donor.

Ziegler-Natta Catalyst Generation 6 (Phthalate replacement): The new 1,2-phenylene dibenzoate internal donors used in Generation 6 Ziegler-Natta catalysts are important as phthalate replacements. In addition, there has been an increase in disclosures of mixed internal donors, for example, blending succinate and diether, or blending succinate and dimethoxytoluene. Generation 6 catalysts can also result in high stereospecificity in the absence of external donor. Thus, depending on crystallinity targets, external donors may or may not be used to reach the desired crystallinity targets.

In an embodiment or in combination with any embodiment mentioned herein, the catalyst systems may comprise the third generation Ziegler-Natta Catalyst, the fourth generation Ziegler-Natta Catalyst, the fifth generation Ziegler-Natta Catalyst, or the sixth generation Ziegler-Natta Catalyst.

In an embodiment or in combination with any embodiment mentioned herein, the catalyst system may comprise the third generation Ziegler-Natta Catalyst or the fourth generation Ziegler-Natta Catalyst.

Generally, the catalyst system comprises at least one external electron donor. In an embodiment or in combination with any embodiment mentioned herein, the external electron donor comprises at least one alkoxy silane, such as a "D" donor (e.g., dicyclopentyldimethoxysilane), a "C" donor (e.g., cyclohexylmethyldimethoxysilane), or a combination thereof. Moreover, in some embodiments, the alkoxy silane can comprise, consist essentially of, or consist entirely of a "D" donor or a "C" donor.

It has been observed that the addition of the above external donors to the catalyst system can increase the hardness (i.e., decrease the needle penetration) and viscosities of the copolymers. However, contrary to what has been previously observed in the art, the electron donors described above can lower the softening points of the produced copolymers instead of increasing them. Furthermore, it has been observed that substantially all (i.e., greater than 95 percent) of the ethylene added to the reactor during the polymerization process can react when the above electron donors are used. Thus, this can result in copolymers having higher ethylene contents and lower propylene contents. Consequently, when using the above electron donors, propylene-ethylene copolymers can be produced that have higher ethylene contents, but still exhibit desired balances between softening point and hardness.

In an embodiment or in combination with any embodiment mentioned herein, the catalyst system can have a molar ratio of external electron donor to titanium of at least 0.1:1, 0.5:1, 1:1, 1.5:1, 2:1, 2.5:1, 3:1, 3.5:1, or 4:1 and/or less than 10:1, 9:1, or 8:1. Additionally, or alternatively, the catalyst system can have a molar ratio of external electron donor to titanium in the range of 0.1:1 to 10:1, 0.5:1 to 10:1, 1:1 to 10:1, 1.5:1 to 10:1, 2:1 to 10:1, 2.5:1 to 10:1, 3:1 to 10:1, 3.5:1 to 10:1, 4:1 to 10:1, 0.5:1 to 9:1, 1:1 to 9:1, 1.5:1 to 9:1, 2:1 to 9:1, 2.5:1 to 9:1, 3:1 to 9:1, 3.5:1 to 9:1, 4:1 to 9:1, 0.5:1 to 8:1, 1:1 to 8:1, 1.5:1 to 8:1, 2:1 to 8:1, 2.5:1 to 8:1, 3:1 to 8:1, 3.5:1 to 8:1, or 4:1 to 8:1.

Additionally or alternatively, in an embodiment or in combination with any embodiment mentioned herein, the catalyst system can comprise a molar ratio of TEAL co-catalyst to the electron donor of at least 0.5:1, 1:1, 2:1, 3:1, 4:1, 5:1, or 6:1 and/or not more than 100:1, 50:1, 35:1, 20:1, 15:1, 10:1, or 8:1. Moreover, the catalyst system can comprise a molar ratio of TEAL co-catalyst to the electron donor in the range of 0.5:1 to 100:1, 1:1 to 50:1, 2:1 to 35:1, 2:1 to 20:1, 2:1 to 15:1, 2:1 to 10:1, or 2:1 to 8:1.

In certain embodiments, the type of electron donor can influence the necessary TEAL/electron donor ratio. For instance, in embodiments where the electron donor is a "D" donor or a "C" donor, the TEAL/electron donor ratio can be less than 20:1.

The catalyst system can exhibit a catalyst activity in the range of 200 to 2,000, 400 to 1,200, 500 to 1,000, 1,000 to 6,000, or 6,000 to 18,000 g/g. Catalyst activity is calculated by measuring the ratio of the weight the polymer made in the reactor to the weight of the catalyst charged into the reactor. These measurements are based on a reaction time of one hour.

Since the addition of external donors can increase viscosity and molecular weight, the addition of hydrogen can be required to act as a chain terminator during polymerization. For example, the process can be carried out at a hydrogen pressure in the range of 5 to 100, 10 to 80, or 15 to 50 psig.

Turning now to the polymerization process conditions, in an embodiment or in combination with any embodiment mentioned herein, the polymerization reaction can occur at a temperature equal to or less than 160° C., equal to or less than 155° C., equal to or less than 150° C., or in the range of 100 to 200, 110 to 180, 110 to 155, 120 to 160, or 120 to 150° C. Furthermore, the polymerization reaction can be carried out at a pressure in the range of 500 to 2,000, 600 to 1,500, 700 to 1,250, or 800 to 1,100 psig.

In an embodiment or in combination with any embodiment mentioned herein, the ratio of ethylene flow to propylene flow into the polymerization reaction can be in the range of 0.1:100 to 18:100, 0.1:100 to 10:100, 0.1:100 to 5:100, 0.1:100 to 4:100, 0.5:100 to 3:100, 0.5:100 to 2:100, 0.5:100 to 1.5:100, 0.5:100 to 1:100, 1:100 to 4:100, 1:100 to 3:100, 1:100 to 2:100, 1.5:100 to 4:100, 1.5:100 to 3:100, 1.5:100 to 2:100, 2:100 to 4:100, 2:100 to 3:100, 3:100 to 18:100, 3:100 to 14:100, 3:100 to 12:100, 3:100 to 10:100, 4:100 to 18:100, 4:100 to 14:100, 4:100 to 12:100, 4:100 to 10:100, 7:100 to 18:100, 7:100 to 14:100, 7:100 to 12:100, 7:100 to 10:100, 8:100 to 18:100, 8:100 to 14:100, 8:100 to 12:100, or 8:100 to 10:100.

In an embodiment or in combination with any embodiment mentioned herein, the ratio of hydrogen flow to propylene flow into the polymerization reaction may be in the range of 0.03:100 to 0.5:100, 0.04:100 to 0.4:100, 0.15:100 to 0.4:100, 0:100 to 0.3:100, 0:100 to 0.2:100, 0:100 to 0.02:100, 0:100 to 0.01:100, 0.01:100 to 0.02:100, 0.04:100 to 0.2:100, 0.05:100 to 0.1:100, 0.07:100 to 0.3:100, or 0.08:100 to 0.4:100.

In an embodiment or in combination with any embodiment mentioned herein, the polymerization reactor can comprise a stirred reactor and the polymerization reaction can have a residence time in the reactor in the range of 0.1 to 6, 0.5 to 4, 1 to 2, 6 to 72, 16 to 36, 16 to 24, 12 to 48, or 12 to 24 hours.

In an embodiment or in combination with any embodiment mentioned herein, the polymerization reactor can comprise a loop reactor and the polymerization reaction can have a residence time in the reactor in the range of 8 to 72, 12 to 48, 12 to 24, or 16 to 36 hours.

In an embodiment or in combination with any embodiment mentioned herein, the ethylene can be added to the reactor as a gas and the propylene can be added as a liquid.

End Uses Comprising the Propylene-Ethylene Copolymer

The inventive propylene-ethylene copolymers described herein and compositions comprising these copolymers can be utilized in a wide array of applications including, for example, adhesives (e.g., automotive adhesives, woodworking adhesives, and packaging adhesives), sealants, caulks, roofing membranes, waterproof membranes and underlayments, carpet, laminates, laminated articles, tapes (e.g., tamper evident tapes, water activated tapes, gummed tape, sealing tape, scrim reinforced tape, veneer tape, reinforced and non-reinforced gummed paper tape, box makers tape, paper tape, packaging tape, HVAC duct tape, masking tape, invisible tape, electrical tape, gaffer tape, hockey tape, medical tape, etc.), labels (e.g., general purpose label, beverage label, freezer label, smart label, consumer electronics, etc.), mastics, polymer blends, wire coatings, molded articles, heat seal coatings, disposable hygiene articles, insulating glass (IG) units, bridge decking, water proofing membranes, waterproofing compounds, bitumen modification, asphalt modification, cable flooding/filling compounds, sheet molded compounds, dough molded compounds, overmolded compounds, rubber compounds, polyester composites, glass composites, fiberglass reinforced plastics, plastic fiber reinforced compounds, wood-plastic composites, polyacrylic blended compounds, lost-wax precision castings, investment casting wax compositions, candles, windows, films, gaskets, seals, O-rings, motor vehicle molded parts, motor vehicle extruded parts, clothing articles, rubber additive/processing aids, and fibers.

Films comprising the inventive propylene-ethylene copolymer described herein and compositions comprising these copolymers include, but are not limited to, multilayer films, coextruded films, calendared films, and cast films. Laminates comprising the inventive propylene-ethylene polymer or compositions comprising the inventive propylene-ethylene polymer include, but are not limited to, paper-foil laminates, paper-film laminates, and nonwoven-film laminates.

Adhesive compositions comprising the inventive propylene-ethylene copolymer described herein and compositions comprising these copolymers may include packaging adhesives, food contact grade adhesives, indirect food contact packaging adhesives, product assembly adhesives, woodworking adhesives, edge-banding adhesives, profile wrapping adhesives, flooring adhesives, automotive assembly adhesives, structural adhesives, mattress adhesives, pressure sensitive adhesives (PSA), PSA tapes, PSA labels, PSA protective films, self-adhesive films, laminating adhesives, flexible packaging adhesives, heat seal adhesives, industrial adhesives, hygiene nonwoven construction adhesives, hygiene core integrity adhesives, and hygiene elastic attachment adhesives.

In an embodiment or in combination with any embodiment mentioned herein, the propylene-ethylene copolymers described herein can be utilized in adhesives, such as, for example, hot melt adhesives, water-based adhesives, solvent-based adhesives, hot melt pressure-sensitive adhesives, solvent-based pressure-sensitive adhesives, hot melt nonwoven/hygiene adhesives, hot melt product assembly adhesives, hot melt woodworking adhesives, hot melt automotive component assembly adhesives, hot melt lamination adhesives, and hot melt packaging adhesives. More particularly, due to their unique combination of tensile strength, elongation at break, softening point, and needle penetration as previously described, adhesives produced from the inventive copolymers can be utilized in a vast array of end products, including hygienic packaging, household appliances, automotive components, woodworking, and packaging applications. Generally, the various properties of the inventive copolymers, such as tensile strength, elongation at break, softening point, and needle penetration, can be selected to suit the intended end use of the composition incorporating the copolymers.

In an embodiment or in combination with any embodiment mentioned herein, the inventive copolymers can be used to produce adhesive compositions useful for packaging, product assembly, heat sealing, laminating, gap sealing (e.g., cable filling), caulks, window sealants, woodworking, edge banding, and/or profile wrapping. As used herein, the terms "adhesive," "adhesive compositions" and "compositions" may be used interchangeably.

In an embodiment or in combination with any embodiment mentioned herein, the adhesive compositions comprise hot melt adhesives. Hot melt adhesives can be applied to a substrate while in its molten state and cooled to harden the adhesive layer. Such adhesives are widely used for various commercial and industrial applications such as product assembly, lamination, and packaging. In these applications, adhesive is applied to at least one substrate for binding the substrate to a second similar or different substrate.

Adhesive, sealant, and other formulators, compounders, and users generally want thermally stable, low color hot melt adhesives with favorable balance of physical properties, including temperature resistance, chemical resistance, cohesive strength, viscosity, adhesion to a variety of substrates, and open and set times that can be tailored to the particular use and application conditions. The balance of desired properties varies with the application, and the inventive hot melt compositions described herein provide an improved balance of properties for multiple end uses.

The hot melt adhesive compositions can have melt rheology and thermal stability suitable for use with conventional hot melt adhesive application equipment. In an embodiment or in combination with any embodiment mentioned herein, the blended components of the hot melt adhesive compositions have low melt viscosity at the application temperature, thereby facilitating flow of the compositions through a coating apparatus, e.g., coating die or nozzle.

The hot melt adhesive composition is useful for bonding a variety of substrates including, for example, cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, polymer film (e.g., polyolefin films, polyvinylidene chloride films, ethylene vinyl acetate films, polyester films, metalized polymer film, multi-layer film, and combinations thereof), fibers and substrates made from fibers (e.g., virgin fibers, recycled fibers, synthetic polymer fibers, cellulose fibers, and combinations thereof), release liners, porous substrates (e.g., woven webs, nonwoven webs, nonwoven scrims, and perforated films), cellulose substrates, sheets (e.g., paper, and fiber sheets), paper products, tape backings, and combinations thereof. Useful composites include, for example, chipboard laminated to metal foil (e.g., aluminum foil), which optionally can be laminated to at least one layer of polymer film, chipboard bonded to film, Kraft bonded to film (e.g., polyethylene film), and combinations thereof.

The hot melt adhesive composition is useful in bonding a first substrate to a second substrate in a variety of applications and constructions including, for example, packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, footwear, disposable absorbent articles (e.g., disposable diapers, sanitary napkins, medical dressings, bandages, surgical pads, drapes, gowns, and meat-packing products), paper products (e.g., paper towels, toilet paper, facial tissue, wipes, tissues, and sheets), veneers, mattress covers, automotive foils, and components of absorbent articles (e.g., an absorbent element, absorbent cores, impermeable layers, acquisition layers, woven webs, and nonwoven webs), and combinations thereof.

The hot melt adhesive composition is also useful in forming laminates of porous substrates and polymer films such as those used in the manufacture of disposable articles including, for example, medical drapes, medical gowns, sheets, feminine hygiene articles, diapers, adult incontinence articles, absorbent pads for animals (e.g., pet pads) and humans (e.g., bodies and corpses), and combinations thereof.

The hot melt adhesive composition can be applied to a substrate in any useful form including, for example, as fibers, as a coating (e.g., a continuous coating or a discontinuous coatings), as a bead, as a film (e.g., a continuous film or a discontinuous film), and combinations thereof. Furthermore, the hot melt adhesives may be applied using any suitable application method including, for example, slot coating, curtain coating, spray coating (e.g., spiral spray, random spraying, and melt blowing), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, and combinations thereof.

In an embodiment or in combination with any embodiment mentioned herein, the hot melt adhesives can be used to form automobile interior materials.

Generally, the inventive hot melt adhesives can be used to form bonds to produce a laminate and multilayer laminates. As used herein, the terms "laminate" and "multilayer laminate" may be used interchangeably.

The inventive compositions of the present disclosure can be bonded to various adherends including, but not limited to: cellulosic polymer materials such as paper, cotton, linen, cloth, and wooden boards; synthetic polymer materials, including polyolefin resins such as polypropylene (PP) and polyethylene (PE), styrene resins such as polystyrene, styrene-butadiene block copolymers (SBS resins), styrene-acrylonitrile copolymers (AS resins), acrylonitrile-ethylene/propylene styrene copolymers (AES resins), and acrylonitrile-butadiene-styrene copolymers (ABS resins), polycarbonate resins (PC resins), PC-ABS resins, (meth) acrylic resins, polyester resins, polyamide resins such as nylon and polyurethane, phenol resins, and epoxy resins; wood materials; metallic materials; plastic material; elastomeric materials; composite materials; fabric materials; glass materials; leather materials, and combinations thereof. The material for the adherend may be a mixture or combination of two or more different materials. In the case that the laminate is formed by bonding two different adherends via an adhesive layer comprising the inventive propylene-ethylene polymers or hot melt adhesives of the present disclosure, the materials of the two adherends may be the same as or different from each other.

The laminate comprising the inventive polymer or compositions can be suitably used in applications where a covering material and a formed article are used as adherends, such as interior materials for automobiles and the like (e.g., ceiling materials for automobile interiors, door components for automobile interiors, dashboard components for automobile interiors, instrument panels, etc.), components for household electrical appliances (e.g. housings for personal computers, frames of flat-screen televisions, etc.), and housing materials (e.g. interior wall boards, decorating films, etc.).

In an embodiment or in combination with any embodiment mentioned herein, multi-layer laminates may be prepared by bonding a covering material, such as a decorating sheet, and a formed article via an adhesive layer comprising the inventive propylene-ethylene polymers or hot melt adhesive compositions. Various preparation methods may be used, such as heat lamination, vacuum forming, vacuum pressure forming, hot pressing, heat rolling, and/or hot stamping.

Typical, but non-limiting, industrial applications of the hot melt adhesive compositions include packaging, woodworking, vehicle (e.g., automotive) interior component assembly, and traditional end use applications (e.g., bookbinding, sanitary disposable consumer articles, and labeling).

Furthermore, in an embodiment or in combination with any embodiment mentioned herein, the inventive copolymers described herein can also be used to modify existing polymer blends that are typically utilized in plastics, elastomeric applications, roofing applications, cable filling, and tire modifications. The inventive copolymers can improve the adhesion, processability, stability, viscoelasticity, thermal properties, and mechanical properties of these polymer blends.

In an embodiment or in combination with any embodiment mentioned herein, the inventive propylene-ethylene copolymers can be modified to produce graft copolymers. In such embodiments, the inventive copolymers can be grafted with maleic anhydride, fumarate and maleate esters, methacrylate esters (e.g., glycidyl methacrylate and hydroxethyl methacrylate), methacrylic acid, vinyl derivatives, silane derivatives, or combinations thereof. These graft copolymers can be produced using any conventional process known in the art including, for example, transesterification and free radical induced coupling.

The various end uses and end products noted above can utilize the inventive copolymer by itself or can combine it with other additives and polymers. Suitable polymers that can be combined with the inventive copolymers to form a polymer blend may include, for example, isoprene-based block copolymers; butadiene-based block copolymers; hydrogenated block copolymers; styrene-ethylene/butylene-styrene block copolymers (SEBS); styrene-isoprene-styrene block copolymers (SIS); styrene-ethylene/propylene-styrene (SEPS); ethylene vinyl acetate copolymers; polyesters; polyester-based copolymers; neoprenes; urethanes; acrylics; polyacrylates; acrylate copolymers, such as, but not limited to, ethylene acrylic acid copolymer, ethylene n-butyl acrylate copolymers, and ethylene methyl acrylate copolymers; polyether ether ketones; polyamides; styrenic block copolymers; hydrogenated styrenic block copolymers; random styrenic copolymers; ethylene-propylene rubbers; ethylene vinyl acetate copolymers; butyl rubbers; styrene butadiene rubbers; butadiene acrylonitrile rubbers; natural rubbers; polyisoprenes; polyisobutylenes; polyvinyl acetates; polyolefins; and combinations thereof.

Polyolefins useful with the inventive propylene-ethylene copolymers can be any that are known in the art. In an embodiment or in combination with any embodiment mentioned herein, the polyolefins can be at least one selected from the group consisting of amorphous polyolefins, semi-crystalline polyolefins, alpha-polyolefins, reactor-ready polyolefins, metallocene-catalyzed polyolefin polymers and elastomers, reactor-made thermoplastic polyolefin elastomers, olefin block copolymers, thermoplastic polyolefins, atactic polypropylene, polyethylenes, ethylene-propylene polymers, propylene-hexene polymers, ethylene-butene polymers, ethylene-octene polymers, propylene-butene polymers, propylene-octene polymers, metallocene-catalyzed polypropylene polymers, metallocene-catalyzed polyethylene polymers, propylene-based terpolymers, copolymers produced from propylene and linear or branched $C_4$-$C_{10}$ alpha-olefin monomers, copolymers produced from ethylene and linear or branched $C_4$-$C_{10}$ alpha-olefin monomers, and functionalized polyolefins.

Functionalized olefin polymers and copolymers may include maleated polyethylene, maleated metallocene polyethylene, maleated metallocene polypropylene, maleated ethylene propylene rubber, maleated polypropylene, maleated ethylene copolymers, functionalized polyisobutylene (typically functionalized with maleic anhydride typically to form a succinic anhydride), and the like.

It has been discovered that blends of the inventive propylene-ethylene copolymers with various types of polyolefins may provide adhesives with improved adhesion, cohesive strength, temperature resistance, viscosity, and open and set times. Thus, in various embodiments, the inventive propylene-ethylene polymers may be combined with at least one polyolefin.

As discussed above, the inventive propylene-ethylene copolymers described herein can be used to produce a hot melt adhesive. In an embodiment or in combination with any embodiment mentioned herein, the adhesive compositions can comprise at least 1, 5, 6, 7, 8, 9, 10, 11, 12, 13, 14, 15, 16. 17, 18, 19, 20, 21, 22, 23, 24, 25, 30, 32, 35, 36, 37, 38, 39, 40, 41, 42, 43, 44, 45, 46, 47, 48, 49, or 50 weight percent of one or more of the propylene-ethylene copolymers, based on the total weight of the adhesive. Additionally, or in the alternative, the adhesive compositions can comprise less than 95, 90, 85, 80, 76, 75, 70, 66, 63, 60, 59, 56, 55, 52, 50, 45, 40, 35, 30, 25, 20, 15, or 10 weight percent of one or more of the propylene-ethylene copolymers, based on the total weight of the adhesive.

In an embodiment or in combination with any embodiment mentioned herein, the adhesive compositions can comprise in the range of 1 to 95, 5 to 90, 5 to 100, 8 to 52, 8 to 50, 8 to 45, 8 to 35, 10 to 80, 20 to 70, 25 to 52, 25 to 50, 25 to 45, 30 to 45, 30 to 60, 35 to 50, 35 to 55, 40 to 55, 50 to 80, 50 to 70, 30 to 90, 30 to 80, 30 to 70, 30 to 60, 30 to 50, or 30 to 40 weight percent of one or more of the propylene-ethylene copolymers, based on the total weight of the adhesive. In certain embodiments, the adhesive composition can be entirely comprised of the inventive copolymer.

In an embodiment or in combination with any embodiment mentioned herein, the adhesives may contain at least one, two, or three inventive propylene-ethylene copolymers selected from TABLES 1A, 1B, 1C, and/or 1D. In such embodiments, the copolymers may include any combination of a high viscosity copolymer (i.e., TABLE 1B), a medium viscosity copolymer (i.e., TABLE 1C), and/or a low viscosity copolymer (i.e., TABLE 1D).

Furthermore, depending on the intended end use, the hot melt adhesive compositions can also comprise various additives including, for example, second polymers, tackifiers, processing oils, waxes, antioxidants, plasticizers, pigments, and fillers.

In an embodiment or in combination with any embodiment mentioned herein, the adhesive compositions can comprise at least 1, 2, 3, 4, 5, 10, 12, 15, 20, 30, 40, 50, or 55 weight percent of at least one second polymer that is different from the inventive copolymers. Additionally, or in the alternative, the adhesive compositions can comprise not more than 90, 80, 70, 55, 40, 35, 30, 25, 20, 15, 14, 13, 12, 11, or 10 weight percent of at least one second polymer that is different from the inventive copolymers. For example, the adhesives can comprise in the range of 10 to 90, 20 to 80, 30 to 70, 40 to 55, 1 to 15, 1 to 3, 1 to 5, 1 to 20, 2 to 15, or 2 to 10 weight percent of at least one second polymer that is different from the inventive copolymers.

In an embodiment or in combination with any embodiment mentioned herein, the adhesive compositions can comprise at least 1, 2, 3, 4, 5, 6, 7, 8, 9, 10, 12, 15, 17, 20, 23, 25, 30, 35, 40, 45, 47 or 50 weight percent of at least one second polymer that is different from the inventive copolymers.

Exemplary second polymers can comprise amorphous polyolefins, semi-crystalline polyolefins, alpha-polyolefins, reactor-ready polyolefins, metallocene-catalyzed polyolefin polymers and elastomers, reactor-made thermoplastic polyolefin elastomers, olefin block copolymers, thermoplastic polyolefins, atactic polypropylene, polyethylenes, ethylene-propylene polymers, propylene-hexene polymers, ethylene-butene polymers, ethylene-octene polymers, propylene-butene polymers, propylene-octene polymers, metallocene-catalyzed polypropylene polymers, metallocene-catalyzed polyethylene polymers, propylene-based terpolymers including ethylene-propylene-butylene terpolymers, copolymers produced from propylene and linear or branched $C_4$-$C_{10}$ alpha-olefin monomers, copolymers produced from ethylene and linear or branched $C_4$-$C_{10}$ alpha-olefin monomers, functionalized polyolefins, isoprene-based block copolymers, butadiene-based block copolymers, hydrogenated block copolymers, styrene-ethylene/butylene-styrene block copolymers (SEBS), styrene-isoprene-styrene block copolymers (SIS), styrene-ethylene/propylene-styrene (SEPS), ethylene vinyl acetate copolymers, polyesters, polyester-based copolymers, neoprenes, urethanes, acrylics, polyacrylates, ethylene acrylic acid copolymers, ethylene n-butyl acrylate copolymers, ethylene methyl acrylate copolymers, polyether ether ketones, polyamides, styrenic block copolymers, hydrogenated styrenic block copolymers, random styrenic copolymers, ethylene-propylene rubbers, ethylene vinyl acetate copolymers, butyl rubbers, styrene butadiene rubbers, butadiene acrylonitrile rubbers, natural rubbers, polyisoprenes, polyisobutylenes, polyvinyl acetates, or a combination thereof.

In an embodiment or in combination with any embodiment mentioned herein, the adhesives containing at least one second polymer may also can contain at least one, two, or three inventive propylene-ethylene copolymers selected from TABLES 1A, 1B, 1C, and/or 1D. In such embodiments, the copolymers may include any combination of a high viscosity copolymer (i.e., TABLE 1B), a medium viscosity copolymer (i.e., TABLE 1C), and/or a low viscosity copolymer (i.e., TABLE 1D).

In an embodiment or in combination with any embodiment mentioned herein, the adhesives can comprise at least 1, 2, 3, 4, 5, 10, 12, 15, 20, 25, 30, 35, 40, 45, or 50 weight percent of at least one polyolefin in addition to the inventive propylene-ethylene copolymer. Additionally, or in the alternative, the adhesive compositions can comprise not more than 99, 95, 90, 85, 80, 75, 70, 65, 60, 55, 50, 45, 40, 35, 30, 25, 20, 15, 12, 11, 10, 5, or 2 weight percent of at least one polyolefin in addition to the inventive propylene-ethylene copolymer, based on the total weight of the adhesive. For example, the adhesive compositions can comprise in the range of 1 to 90, 1 to 60, 1 to 40, 1 to 20, 10 to 90, 20 to 80, 20 to 40, 30 to 70, 30 to 40, 40 to 55, 10 to 15, 1 to 3, 1 to 5, 1 to 15, 1 to 10, 2 to 15, or 2 to 10 weight percent of at least one polyolefin, based on the total weight of the adhesive.

Commercial examples of acceptable polyolefins include Aerafin™ 17 by Eastman; Aerafin™ 180 by Eastman; Rextac™ polymers made by REXtac LLC including Rextac™ E-63, E-65, 2760, 2815, 2730, and 2830; Vestoplast® polymers made by Evonik Industries, including Vestoplast® 408 and 708; and Eastoflex® by Eastman, including Eastoflex® E1060 and P1010.

Some examples of metallocene-catalyzed polymers include polyolefins, such as polyethylene, polypropylene, and copolymers thereof. Exemplary polypropylene-based elastomers include those sold by ExxonMobil Chemical under the trade name VISTAMAXX™ and those sold by Idemitsu Kosan (Japan) under the trade name L-MODU™, Exemplary polyethylene-based elastomers and plastomers include those sold by Dow Chemical Company under the trade names AFFINITY™, AFFINITY™ GA, INFUSE™, and ENGAGE™, those sold by ExxonMobil Chemical Company (Houston, Texas) under the trade name VISTAMAXX™, and those sold by Clariant under the trade name LICOCENE™.

In an embodiment or in combination with any embodiment mentioned herein, olefin polymers may include a mixture of at least two different olefin polymers, such as a blend that includes an olefin homopolymer and an olefin copolymer, a blend that includes different olefin homopolymers of the same or different monomer, a blend that includes different olefin copolymers, and various combinations thereof. Useful olefin polymers also include, for example, modified, unmodified, grafted, and ungrafted olefin polymers, uni-modal olefin polymers, multimodal olefin polymers, and combinations thereof.

In many cases, these added polyolefins can increase the cohesive strength, adhesion properties, tackiness, low temperature flexibility, total crystallinity, and/or temperature resistance of the inventive adhesive compositions. Furthermore, the addition of the aforementioned polyolefins may decrease the production costs of the compositions due to their widespread availability.

In an embodiment or in combination with any embodiment mentioned herein, the adhesive compositions can comprise the inventive propylene-ethylene copolymer and a metallocene-catalyzed polyethylene copolymer, such as an ethylene-octene copolymer. In such embodiments, the inventive propylene-ethylene copolymer can be used to replace the polyethylene in various types of adhesives, such as those used for packaging applications.

In an embodiment or in combination with any embodiment mentioned herein, the added polymer and/or polyolefin can be functionalized with groups including, but not limited to, silanes, acid anhydride such as maleic anhydride, hydroxyl, ethoxy, epoxy, siloxane, amine, aminesiloxane, carboxy, and acrylates, at the polymer chain ends and/or pendant positions within the polymer.

The additional polymers and polyolefins that can be added to the inventive adhesive compositions may be prepared by a Ziegler-Natta catalyst, a single site catalyst (metallocene), multiple single site catalysts, non-metallocene heteroaryl catalysts, or a combination thereof. The additional polymers may comprise a combination of amorphous, semi-crystalline, random, branched, linear, or blocky structures.

Generally, any conventional polymerization synthesis processes may prepare the additional polyolefin components. In an embodiment or in combination with any embodiment mentioned herein, one or more catalysts, which are typically metallocene catalysts or Ziegler-Natta catalysts, are used for polymerization of an olefin monomer or monomer mixture. Polymerization methods may include high pressure, slurry, gas, bulk, suspension, supercritical, or solution phase, or a combination thereof. The catalysts can be in the form of a homogeneous solution, supported, or a combination thereof. Polymerization may be carried out by a continuous, a semi-continuous, or batch process, and may include use of chain transfer agents, scavengers, or other such additives as deemed applicable.

In an embodiment or in combination with any embodiment mentioned herein, the additional polymer is produced in a single or multiple polymerization zones using a single polymerization catalyst. Metallocene (or heterophase) polymers are typically made using multiple metallocene catalyst blends that obtain the desired heterophase structure.

In an embodiment or in combination with any embodiment mentioned herein, the crystalline content of the added polymers or polyolefins can increase the cohesive strength of the adhesive compositions. Generally, formulations based on metallocene polymerized semicrystalline copolymers can eventually build sufficient crystalline content over time to achieve good cohesive strength in the formulation.

In an embodiment or in combination with any embodiment mentioned herein, the adhesive compositions can comprise at least 1, 5, 10, 15, 20, 25, 30, 35, 40, 45, 46, 47, 48, 50, 55 or 60 weight percent of at least one tackifier, based on the total weight of the adhesive. Additionally, or in the alternative, the adhesive compositions can comprise not more than 90, 80, 70, 60, 55, 50, 45, 40, 35, 30, 25, 20, 15, 10, or 5 weight percent of at least one tackifier, based on the total weight of the adhesive. For example, the adhesives can comprise in the range of 5 to 90, 20 to 80, 20 to 40, 20 to 30, 30 to 70, 35 to 50, 35 to 55, 35 to 60, 40 to 50, 40 to 55, 40 to 60, or 45 to 50 weight percent of at least one tackifier, based on the total weight of the adhesive.

Generally, the tackifier improves tack and adhesion of the adhesive and may also lower the viscosity of the adhesive. Lower viscosity can improve application flow characteristics, allowing for easier processing, lower energy requirements, and lower processing temperatures. Lower viscosity also helps the adhesive to "wet out," or to substantially uniformly coat the surface and penetrate the substrate. Tack is required in most adhesive formulations to allow for proper joining of articles prior to solidification of the hot melt adhesive. The desirability and selection of the particular tackifying agent can depend upon the specific types of olefin copolymer and additional polymers employed.

Suitable tackifiers can include, for example, cycloaliphatic hydrocarbon resins; $C_5$ hydrocarbon resins; $C_5/C_9$ hydrocarbon resins; aromatically-modified $C_5$ resins; $C_9$ hydrocarbon resins; pure monomer resins, such as copolymers or styrene with alpha-methyl styrene, vinyl toluene, para-methyl styrene, indene, methyl indene, $C_5$ resins, and $C_9$ resins; terpene resins; terpene phenolic resins; terpene styrene resins; rosin esters; modified rosin esters; liquid resins of fully or partially hydrogenated rosins; fully or partially hydrogenated rosin esters; fully or partially hydrogenated modified rosin resins; fully or partially hydrogenated rosin alcohols; fully or partially hydrogenated $C_5$ resins; fully or partially hydrogenated $C_5/C_9$ resins; fully or partially hydrogenated aromatically-modified $C_5$ resins; fully or partially hydrogenated $C_9$ resins; fully or partially hydrogenated pure monomer resins; fully or partially hydrogenated $C_5$/cycloaliphatic resins; fully or partially hydrogenated $C_5$/cycloaliphatic/styrene/$C_9$ resins; fully or partially hydrogenated cycloaliphatic resins; and combinations thereof. Exemplary commercial hydrocarbon resins include Regalite™ hydrocarbon resins. In certain embodiments, the tackifiers can comprise functionalized tackifiers.

In an embodiment or in combination with any embodiment mentioned herein, the adhesive compositions can comprise at least 1, 2, 3, 4, 5, 7, 8, 9, or 10 and/or not more than 40, 30, 25, 20, 15, 10.5, 10, 6, or 5 weight percent of at least one processing oil, based on the total weight of the adhesive. For example, the adhesives can comprise in the range of 2 to 40, 2 to 20, 2 to 15, 2 to 10.5, 2 to 5, 5 to 30, 8 to 25, 1 to 15, or 10 to 20 weight percent of at least one processing oil, based on the total weight of the adhesive. Processing oils can include, for example, mineral oils, naphthenic oils, paraffinic oils, aromatic oils, castor oils, rape seed oil, triglyceride oils, or combinations thereof. As one skilled in the art would appreciate, processing oils may also include extender oils, which are commonly used in adhesives. The use of oils in the adhesives may be desirable if the adhesive is to be used as a pressure-sensitive adhesive to produce tapes or labels or as an adhesive to adhere nonwoven articles. In certain embodiments, the adhesive may not comprise any processing oils.

In an embodiment or in combination with any embodiment mentioned herein, the adhesive compositions can comprise at least 1, 2, 3, 4, 5, 6, 7, 8, 9, 10, 11, 12, 15, 16, 17, 18, 19, 20, 21, 22, 23, or 25 weight percent of at least one wax, based on the total weight of the adhesive. Additionally, or in the alternative, the adhesive compositions can comprise not more than 40, 30, 25, 20, 15, 10, 7, 5, or 3 weight percent of at least one wax, based on the total weight of the adhesive. For example, the adhesives can comprise in the range of 1 to 40, 5 to 30, 8 to 25, 10 to 20, 3 to 7, 2 to 5, 2 to 7, 2 to 40, 2 to 30, 2 to 25, 2 to 20, 2 to 10, 1 to 25, 1 to 20, 1 to 15, 1 to 10, 1 to 7, or 1 to 5 weight percent of at least one wax. Waxes serve to reduce the overall viscosity of the adhesive, thereby allowing it to liquefy and allowing for the proper application or coating of the hot melt adhesive onto an intended substrate. The type and melting point of a wax, and its compatibility with other components of the adhesive composition, control the open time and setting speed of the adhesive. Open time is known in the art as being the amount of time for an adhesive to wet out and bond to a substrate after application. Any conventionally known wax, which is suitable for use in formulating hot melt adhesives, may be used in the practice of the invention.

Suitable waxes can include, for example, microcrystalline wax, paraffin wax, waxes produced by Fischer-Tropsch processes, functionalized waxes (maleated, fumerated, or wax with functional groups etc.), polyolefin waxes, petroleum waxes, polypropylene waxes, polyethylene waxes, ethylene vinyl acetate waxes, and vegetable waxes. The use of waxes in the adhesives may be desirable if the adhesive is to be used as a hot melt packaging adhesive.

Non-limiting examples of commercially available waxes that are suitable for this invention include Sasol® H-1, available from Sasol Wax Americas, Inc.; A-C™-9, AC-596, and A-C 810, available from Honeywell International Inc.; EPOLENE™ N-15, E-43, C-10, and C-18 available from Westlake; and POLYWAX™ 400, 850, 1000, and 3000 from Baker Hughes Inc. Other exemplary waxes include, but are not limited to, microcrystalline wax Be Square™ 195 and Clariant Licocene™ PE4201.

As used herein, "functionalized" means that the associated component is either prepared in the presence of a functional group that is incorporated into the component or is contacted with a functional group, and, optionally, a catalyst, heat, initiator, or free radical source to cause all or part of the functional group (such as maleic acid or maleic anhydride) to incorporate, graft, bond to, physically attach to, and/or chemically attach to the polymer.

Exemplary functionalized waxes polymers useful as functionalized components include those modified with an alcohol, an acid, a ketone, an anhydride, and the like. Commercial functionalized waxes include maleated polypropylene available from Chusei under the tradename MAPP 40; maleated metallocene waxes (such as TP LICOCENE PP1602 available from Clariant); maleated polyethylene waxes and maleated polypropylene waxes available from Westlake under the tradenames EPOLENE C-16, EPOLENE C-18, EPOLENE E43; EASTMAN G-3003 from Eastman Chemical; maleated polypropylene wax LICOMONT AR 504 available from Clariant; grafted functional polymers available from Dow Chemical Co. under the tradenames AMPLIFY EA 100 and AMPLIFY VA 200; and CERAMER maleated ethylene polymers available from Baker Hughes under the tradenames CERAMER 1608, CERAMER 1251, CERAMER 67, and CERAMER 24. Useful waxes also include polyethylene and polypropylene waxes having an Mw of 15,000 of less, preferably from 3,000 to 10,000, and a crystallinity of 5 weight percent or more, preferably 10 weight percent or more, having a functional group content of up to 10 weight percent. Additional functionalized polymers that may be used as functional components include A-C 575P, A-C 573P, A-C X596A, A-C X596P, A-C X597A, A-C X597P, A-C X950P, A-C X1221, A-C 395A, A-C 395A, A-C 1302P, A-C 540, A-C 54A, A-C 629, A-C 629A, A-C 307, and A-C 307A available from Honeywell International.

In an embodiment or in combination with any embodiment mentioned herein, the adhesive composition may not comprise a wax. For instance, the adhesive composition may comprise less than 10, 7, 5, 4, 3, 2, 1, or 0.5 weight percent of a wax such as, but not limited to, a polyethylene wax and/or a Fischer Tropsch wax.

In an embodiment or in combination with any embodiment mentioned herein, the adhesive compositions can comprise at least 0.1, 0.2, 0.5, 1, 2, or 3 and/or not more than 20, 10, 8, 5, 1, or 0.5 weight percent of at least one antioxidant, based on the total weight of the adhesive. For example, the adhesive compositions can comprise in the range of 0.1 to 20, 1 to 10, 2 to 8, 3 to 5 or 0.5 to 2 weight percent of at least one antioxidant.

In an embodiment or in combination with any embodiment mentioned herein, the adhesive compositions can comprise at least 0.5, 1, 2, or 3 and/or not more than 20, 10, 8, or 5 weight percent of at least one plasticizer, based on the total weight of the adhesive. For example, the adhesives can comprise in the range of 0.5 to 20, 1 to 10, 2 to 8, or 3 to 5 weight percent of at least one plasticizer. Suitable plasticizers can include, for example, olefin oligomers, low molecular weight polyolefins such as liquid polybutylene, polyisobutylene, mineral oils, dibutyl phthalate, dioctyl phthalate, chlorinated paraffins, and phthalate-free plasticizers. Commercial plasticizers can include, for example, Benzoflex™ plasticizers (Eastman Chemical); Eastman 168™ (Eastman Chemical); Oppanol® B10 (BASF); REGALREZ 1018 (Eastman Chemical); Calsol 5550 (Calumet Lubricants); Kaydol oil (Chevron); or ParaLux oil (Chevron).

In an embodiment or in combination with any embodiment mentioned herein, the adhesive compositions can comprise at least 5, 10, 20, 30, or 40 and/or not more than 90, 80, 70, or 55 weight percent of at least one filler, based on the total weight of the adhesives. For example, the adhesives can comprise in the range of 1 to 90, 20 to 80, 30 to 70, or 40 to 55 weight percent of at least one filler. Suitable fillers can include, for example, carbon black, calcium carbonate, clay, titanium oxide, zinc oxide, or combinations thereof.

The adhesive compositions can be produced using conventional techniques and equipment. For example, the components of the adhesive composition may be blended in a mixer such as a sigma blade mixer, a plasticorder, a brabender mixer, a twin screw extruder, or an in-can blend (pint-cans). In an embodiment or in combination with any embodiment mentioned herein, the adhesive may be shaped into a desired form, such as a tape or sheet, by an appropriate technique including, for example, extrusion, compression molding, calendaring or roll coating techniques (e.g., gravure, reverse roll, etc.), curtain coating, slot-die coating, or spray coating.

Furthermore, the adhesive compositions may be applied to a substrate by solvent casting processes or by melting the adhesive and then using conventional hot melt adhesive application equipment known in the art. Suitable substrates can include, for example, nonwoven, textile fabric, paper, glass, plastic, films, wood, and metal. Generally, 0.1 to 100 g/m$^2$ or 1 to 1,000 g/m$^2$ of the adhesive composition can be applied to a substrate.

In an embodiment or in combination with any embodiment mentioned herein, the hot melt adhesive compositions can have a Brookfield viscosity at 177° C. of at least 100, 300, 500, 750, or 1,000 and/or not more than 60,000, 40,000, 30,000, 20,000, 10,000, 5,000, 4,000, 3,000, or 2,500 cps as measured according to ASTM D3236. For example, the hot melt adhesives can have a Brookfield viscosity at 177° C. in the range of 100 to 60,000, 300 to 10,000, 500 to 5,000, 750 to 2,500, 400 to 3,000, 500 to 1,000, 500 to 5,000, 500 to 10,000, 500 to 15,000, 500 to 20,000, 1,000 to 5,000, 1,000 to 10,000, 1,000 to 15,000, 1,000 to 20,000, 1,000 to 40,000, or 1,000 to 60,000 cps.

In an embodiment or in combination with any embodiment mentioned herein, the hot melt adhesive compositions can have a Brookfield viscosity at 140° C. of at least 100, 500, 1,000, 2,000, 3,000, 4,000, 5,000, 6,000, 7,000, 8,000, or 9,000 and/or not more than 60,000, 40,000, 30,000, 20,000, or 15,000 cps as measured according to ASTM D3236. For example, the hot melt adhesives can have a Brookfield viscosity at 140° C. in the range of 100 to 60,000, 500 to 20,000, 3,000 to 15,000, 4,000 to 15,000, 5,000 to 15,000, 5,000 to 15,000, or 6,000 to 15,000 cps.

In an embodiment or in combination with any embodiment mentioned herein, the hot melt adhesive compositions can have a Brookfield viscosity at 150° C. of at least 100, 500, 1,000, 1,500, 2,000, 3,000, 4,000, 5,000, 6,000, 7,000, 8,000, or 9,000 and/or not more than 60,000, 40,000, 30,000, 20,000, or 15,000 cps as measured according to ASTM D3236. For example, the hot melt adhesives can have a Brookfield viscosity at 150° C. in the range of 100 to 60,000, 500 to 20,000, 1,000 to 15,000, 1,000 to 4,000, 2,000 to 15,000, 3,000 to 15,000, 4,000 to 15,000, or 4,000 to 10,000 cps.

In an embodiment or in combination with any embodiment mentioned herein, the hot melt adhesive compositions can have a Brookfield viscosity at 160° C. of at least 100, 500, 1,000, 1,500, 2,000, 2,500, 3,000, 3,500, or 4,000 and/or not more than 60,000, 40,000, 30,000, 20,000, 10,000, 9,000, or 8,000 cps as measured according to ASTM D3236. For example, the hot melt adhesives can have a Brookfield viscosity at 160° C. in the range of 100 to 60,000, 500 to 1,000 to 10,000, 1,500 to 10,000, 2,000 to 10,000, 1,000 to 8,000, 1,000 to 5,000, 1,000 to 4,000, or 2,000 to 10,000 cps.

In an embodiment or in combination with any embodiment mentioned herein, the hot melt adhesive compositions can have a Brookfield viscosity at 190° C. of at least 100, 500, 1,000, 2,000, 3,000, 4,000, 5,000, 6,000, 7,000, 8,000, or 9,000 and/or not more than 60,000, 50,000, 40,000, 30,000, 20,000, or 15,000 cps as measured according to ASTM D3236. For example, the hot melt adhesives can have a Brookfield viscosity at 190° C. in the range of 100 to 60,000, 500 to 20,000, 1,000 to 5,000, 1,000 to 4,000, or 2,000 to 10,000, 1,000 to 20,000, 3,000 to 15,000, 4,000 to 15,000, 5,000 to 15,000, 5,000 to 15,000, or 6,000 to 15,000 cps.

In an embodiment or in combination with any embodiment mentioned herein, the hot melt adhesive compositions can have a 90-degree (T-peel) peel strength of at least 1, 2, 5, 10, 15, 20, 25, 30, 35, 40, 45, 50, 55, 60, 65, 70, 75, 80, 90, 95, 100, 105, 110, 115, 120, 125, 130, 135, 140, 145, or 150 g/25 mm, as measured according to ASTM D903. Additionally, or in the alternative, the hot melt adhesive compositions can have a 90-degree (T-peel) peel strength of not more than 200, 190, 180, 170, 160, 150, 140, 130, 120, 110, 100, 95, 90, 85, or 80 g/25 mm, as measured according to ASTM D903. The aforementioned peel strength values can be applicable after the adhesive has set for 24 hours at room temperature, after the adhesive has set for four hours at 38° C., after the adhesive has set for two weeks at 55° C., and/or after the adhesive has set for one month at 25° C. For example, the hot melt adhesives can have a peel strength in the range of 1 to 200, 10 to 180, 20 to 150, 30 to 140, 40 to 120, 55 to 200, 55 to 100, 55 to 150, 55 to 200 70 to 200, 100 to 200, or 115 to 200 g/25 mm, as measured according to ASTM D903.

As noted above, due to the unique propylene-ethylene copolymers, the hot melt adhesive compositions can exhibit desirable peel strengths even after aging. In an embodiment or in combination with any embodiment mentioned herein, the hot melt adhesive compositions may exhibit a 90-degree (T-peel) peel strength in the range of 1 to 200, 10 to 180, 20 to 150, 30 to 140, 40 to 120, 55 to 200, 55 to 100, 55 to 150, 55 to 200 70 to 200, 100 to 200, or 115 to 200 g/25 mm, as measured according to ASTM D903, after the adhesive has set for 24 hours at room temperature, after the adhesive has set for four hours at 38° C., after the adhesive has set for two weeks at 55° C., and/or after the adhesive has set for one month at 25° C. Additionally, or in the alternative, the hot melt adhesive compositions may exhibit a 90-degree (T-peel) peel strength after aging for 4 hours, 24 hours, two weeks, or one month that is at least 50, 55, 60, 65, 70, 75, 80, 85, or 90 percent of the initial 90-degree (T-peel) peel strength.

Generally, the adhesive compositions containing the inventive copolymers can have a broad operating window and may have an application window from 80 to 230° C. This broad operating window can be demonstrated by the peel strengths of the adhesives at different temperatures.

In an embodiment or in combination with any embodiment mentioned herein, the hot melt adhesive compositions can exhibit a holding power at 60° C. of at least 5, 15, 20, or 25 minutes and/or not more than 150 minutes. Additionally, or in the alternative, the hot melt adhesives can exhibit a holding power at 50° C. of at least 400, 600, 800, or 1,000 minutes. The holding power at 50° C. and 60° C. can be measured by stabilizing glued carton substrates overnight at room temperature, which is normally 20 to 23° C., and then hanging the substrates in a shear bank oven in the peel mode. A weight is then hung under the glued substrate. The time at which the weight drops due to failure is recorded for each specimen.

In an embodiment or in combination with any embodiment mentioned herein, the hot melt adhesive compositions can exhibit a shear adhesion failure temperature ("SAFT") of at least 75, 80, 85, 90, 95, 100, 110, 120, 130, or 135° C. as measured according to ASTM D4498-07. Additionally, or in the alternative, the hot melt adhesive compositions can exhibit a shear adhesion failure temperature ("SAFT") of not more than 200, 160, 155, 150, 140, 135, 134, 133, 130 or 135° C. as measured according to ASTM D4498-07. For example, the hot melt adhesives can exhibit a SAFT in the range of 2 to 200, 50 to 150, 75 to 125, 130 to 160, 130 to 155, 130 to 150, 130 to 145, 135 to 155, 135 to 150, 140 to 160, 140 to 155, 140 to 150, 145 to 160, 145 to 155, or 145 to 150° C. as measured according to ASTM D4498-07.

In an embodiment or in combination with any embodiment mentioned herein, the hot melt adhesive compositions can exhibit a lap shear of at least 25, 50, 75, or 100 and/or not more than 300, 275, 250, 225, 200, 175, 150, or 125 lbf as measured according to ASTM D1002. For example, the hot melt adhesive compositions can exhibit a lap shear in the range of 25 to 300, 50 to 275, 75 to 250, 100 to 250, or 100 to 225 lbf, as measured according to ASTM D1002.

In an embodiment or in combination with any embodiment mentioned herein, the hot melt adhesive compositions can exhibit a high temperature performance fiber tear ("HTFT") at 60° C. of at least 50, 65, 70, 75, 80, 85, 90 or 95 percent. The HTFT test consists of manually tearing a glued corrugated cardboard (carton) substrate by hand under the condition of 60° C. The glued carton substrates must be stabilized under the conditions of 60° C. at 4 hours±5 minutes before the tearing. If 80% of the substrate breaks, the test is considered a pass, and therefore, the hot melt adhesive is considered to perform well. For some applications, if 50% fiber of the substrate breaks, the test is considered a pass and the adhesive is considered to perform well at 60° C.

In an embodiment or in combination with any embodiment mentioned herein, the hot melt adhesive compositions can exhibit a Ring and Ball softening point as measured ASTM method E-28 of at least 100, 105, 110, 115, 120, 125, or 130° C. and/or not more than 200, 190, 180, 170, 160, 150, or 140° C. For example, the hot melt adhesive compositions can exhibit a Ring and Ball softening point as measured ASTM method E-28 of 100 to 200° C., 110 to 180° C., 125 to 160° C., or 130 to 150° C.

In an embodiment or in combination with any embodiment mentioned herein, the hot melt adhesive compositions can exhibit a heat resistance of at least 80, 85, 90, 95, or 100° C. and/or not more than 200, 175, 150, 140, 130, 125, or 120° C. For example, the hot melt adhesive compositions can exhibit a heat resistance of 80 to 200° C., 90 to 175° C., 100 to 140° C., or 100 to 125° C.

In an embodiment or in combination with any embodiment mentioned herein, the adhesives containing the inventive copolymers do not exhibit substantial changes in color when subjected to storage conditions at elevated temperatures over extended periods of time. Before any aging due to storage occurs, the adhesives can have an initial Gardner color of less than 18, 15, 10, 8, 5, 4, 3, 2, or 1 as measured according to ASTM D1544. After being heat aged at 177° C. for about 96 hours, the adhesives can exhibit a final Gardner color of less than 18, 15, 10, 7, 5, 3, 2 or 1 as measured according to ASTM D1544. Thus, the adhesives can retain a desirable color even after prolonged storage and exposure.

An exemplary adhesive formulation for use in various applications and on various adherends is provided below in TABLE 2. In addition, TABLE 2 provides broad, intermediate, and narrow ranges for various characteristics of the adhesive formulation, which may be combined in any combination regardless of their category (e.g., one or more broad ranges may be combined with one or more intermediate and/or narrow ranges). Furthermore, although broad, intermediate, and narrow ranges are provided in TABLE 2, it is envisioned that any of the ranges described above regarding the composition of the adhesive formulations (e.g., polymer content, tackifier content, etc.) and the accompanying performance properties may be applicable to the adhesive formulation provided in TABLE 2, unless such combination creates a contradiction.

herein may include adhesives, sealants, caulks, roofing membranes, waterproof membranes and underlayments, carpet, laminates, laminated articles, tapes, labels, mastics, polymer blends, wire coatings, molded articles, heat seal coatings, disposable hygiene articles, insulating glass (IG) units, bridge decking, electronic housings, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, book bindings, candles, windows, tires, films, gaskets, seals, O-rings, motor vehicles (automobiles), motor bicycles (motorcycles), buses, streetcars, trucks, motor vehicle molded parts, motor vehicle extruded parts, clothing articles, rubber additive/processing aids, and fibers.

Exemplary adhesives that may be produced with the adhesive compositions described herein may include: packaging adhesives, food contact grade adhesives, indirect food contact packaging adhesives, product assembly adhesives, woodworking adhesives, edge banding adhesives, profile wrapping adhesives, flooring adhesives, automotive assembly adhesives, structural adhesives, flexible laminating adhesive, rigid laminating adhesive, flexible film adhesive, flexible packaging adhesive, home repair adhesive, industrial adhesive, construction adhesive, furniture adhesive, mattress adhesives, pressure sensitive adhesives (PSA), PSA tapes, PSA labels, PSA protective films, self-adhesive films,

TABLE 2

| | Broad | Intermediate | Intermediate | Narrow |
|---|---|---|---|---|
| Inventive Propylene-Ethylene Copolymer (Wt. %) | 5 to 100 | 5 to 95 | 20 to 80 | 30 to 75 |
| Second Polymer(s) (Wt. %) | 0 to 90 | 5 to 55 | 1 to 25 | 1 to 15 |
| Tackifier(s) (Wt. %) | 0 to 70 | 1 to 65 | 5 to 60 | 15 to 55 |
| Processing Oil(s) (Wt. %) | 0 to 20 | 1 to 20 | 2 to 20 | 5 to 15 |
| Wax(es) (Wt. %) | 0 to 35 | 0 to 20 | 1 to 15 | 1 to 10 |
| Brookfield Viscosity at 160° C. (cP) | 100 to 60,000 | 1,000 to 20,000 | 1,000 to 10,000 | 2,000 to 10,000 |
| Brookfield Viscosity at 190° C. (cP) | 100 to 60,000 | 1,000 to 20,000 | 4,000 to 15,000 | 6,000 to 15,000 |
| Initial Peel Strength (g/25 mm) | 1 to 200 | 10 to 180 | 30 to 140 | 40 to 120 |
| Peel Strength after 24 Hours | 1 to 200 | 10 to 180 | 30 to 140 | 40 to 120 |
| SAFT (° C.) | 2 to 200 | 50 to 150 | 75 to 125 | 130 to 155 |
| Heating Resistance (° C.) | 80 to 200 | 90 to 175 | 100 to 140 | 100 to 125 |
| RBSP (° C.) | 100 to 200 | 110 to 180 | 125 to 160 | 130 to 150 |
| Lap Shear (lbf) | 25 to 300 | 50 to 275 | 100 to 250 | 100 to 225 |

In an embodiment or in combination with any embodiment mentioned herein, the inventive propylene-ethylene copolymer can be utilized in adhesive compositions as described previously in this disclosure. In particular, the inventive propylene-ethylene copolymer can be utilized to produce hot melt adhesives having a wide process window and a high peel strength for laminated materials, such as, but not limited to, hygiene products.

As discussed above, the adhesive compositions described herein may be used to bond a variety of substrates and adherends, thereby forming a multilayered laminate. For instance, an article may be produced with the adhesive compositions by: (a) applying the adhesive composition onto at least a portion of a substrate surface and (b) contacting the treated surface with another surface to thereby form the laminate.

Various articles can be produced using the adhesive compositions described herein. Exemplary articles that may be produced with the adhesive compositions described laminating adhesives, flexible packaging adhesives, heat seal adhesives, industrial adhesives, hygiene nonwoven construction adhesives, hygiene core integrity adhesives, and hygiene elastic attachment adhesives.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1—High Viscosity Propylene-Ethylene Copolymers with High and Medium Tensile Strength Various inventive propylene-ethylene copolymers were produced that had a high viscosity and exhibited a medium tensile strength. The propylene-ethylene copolymers were produced in accordance with the following polymerization process.

The reactants propylene, ethylene, and hydrogen, along with a diluent, an external donor, and catalyst were fed into a 5-gallon continuously stirred tank reactor (CSTR) at the ratios, flow rates, and temperatures provided in TABLE 3, below, for each of the produced samples. The inventive samples and comparative samples (i.e., the comparative samples that were produced) were made with the Generation 3 (Benozate) catalyst and an alkoxy silane as the external electron donor described above. The reactor operated at a pressure ranging from 790 to 850 psi. Furthermore, a hot oil system provided tracing for the reactor jacket. A dip tube carried the product out of the reactor, and an equilibar pressured by helium-maintained pressure control of the reactor.

The copolymer from the letdown tank was then stripped of diluent, and residual catalyst was then deactivated in a hot oil jacketed exchanger using steam and nitrogen. Molten copolymer was then collected from the bottom of the deactivator and pumped to a final product collection tank. The resulting inventive copolymers (i.e., samples beginning with a numeral, e.g., "1A") and comparative copolymers (i.e., samples beginning with a "C", e.g., "C1") were produced in accordance with the reaction conditions listed in TABLE 3.

(non-deuterated). The resulting solution was stirred magnetically at 120° C. until complete dissolution of the copolymer was observed by visual inspection. Dissolution was typically complete within 1 hour. A 10 mm NMR tube was warmed to 80° C. While wearing heat-resistant gloves, the warm solution was poured into the 10 mm NMR tube until the sample height was about 4.5-5 cm. The tube was then capped with a push-on cap. It was important to transfer the solution to the NMR tube while it was still warm so that it did not solidify before the transfer is complete. Spectra were analyzed using MNova software. After a Fourier transform was applied to the FID data, spectra were phased, and the baselines were corrected, and calculations performed as described in the above references. It was determined that the standard deviation on PP % was 0.7 and on mm % was 0.3.

Tensile Strength Sample Preparation

A Carver press was used to prepare film samples for tensile tests. First, 20 grams of molten samples were placed in a 5"×5" (137 mm×137 mm) aluminum square mold frame with a thickness of one mm. Subsequently, samples were sandwiched by silicone-coated PET films, release papers, and metal plates and then heated up in the Carver press with zero pressure applied. Samples were compression molded at 177° C. to 188° C. for 12 minutes, and then 6000 PSI pressure was applied for five seconds and released. Afterwards, pressure was increased to 12000 PSI and released again. Finally, 18000 PSI pressure was applied and held for

TABLE 3

| Sample | Propylene (Wt %) | Ethylene (Wt %) | Triad Tacticity (mm content %) | Donor Ratio | Reactor Temp (° C.) | PP Flow (g/hr) | Ethylene Flow (g/hr) | H2 Flow (g/hr) |
|---|---|---|---|---|---|---|---|---|
| 1A | 80.8 | 19.2 | 55.3 | 3.0 | 150 | 682 | 42.0 | 0.35 |
| 1B | 80.5 | 19.5 | 53.5 | 3.0 | 150 | 682 | 27.0 | 0.31 |
| 1C | 78.9 | 21.1 | 54.4 | 3.0 | 150 | 682 | 28.0 | 0.22 |
| 1D | 81.5 | 18.5 | 54.2 | 3.0 | 150 | 682 | 27.0 | 0.66 |
| 1E | 79.9 | 20.1 | 57.6 | 3.0 | 130 | 682 | 80.0 | 1.10 |
| 1F | 79.4 | 20.6 | 56.4 | 3.0 | 140 | 682 | 65.0 | 0.55 |
| 1G | 81.9 | 18.1 | 58.5 | 3.0 | 140 | 682 | 65.0 | 0.52 |
| 1H | 78.5 | 21.5 | 55.9 | 1.75 | 130 | 682 | 80.0 | 0.30 |
| 1I | 83.5 | 16.5 | 62.0 | 2.0 | 150 | 682 | 50.0 | 1.20 |
| 1J | 86.5 | 13.5 | 66.3 | 1.8 | 150 | 682 | 30.0 | 0.30 |
| 1K | 87.8 | 12.2 | 68.0 | 1.8 | 150 | 682 | 30.0 | 0.30 |
| 1L | 83.4 | 16.6 | 62.7 | 3.0 | 140 | 682 | 50.0 | 0.50 |
| 1M | 83.8 | 16.2 | 62.7 | 3.0 | 140 | 682 | 55.0 | 0.40 |
| 1N | 83.9 | 16.1 | 62.9 | 3.0 | 140 | 682 | 60.0 | 0.40 |
| 1O | 85.0 | 15.0 | 63.0 | 3.0 | 140 | 682 | 60.0 | 0.40 |
| 1P | 85.7 | 14.3 | 65.5 | 0.5 | 130 | 682 | 55.0 | 0.30 |
| 1Q | 88.7 | 11.3 | 73.4 | 3.0 | 130 | 682 | 30.0 | 3.00 |
| C1 | 60.0 | 40.0 | 25.5 | 0.7 | 150 | 682 | 80.0 | 0.80 |
| C2 | 58.9 | 41.1 | 27.4 | 0.9 | 150 | 682 | 70.0 | 0.90 |
| C3 | 64.6 | 35.4 | 33.9 | 3.0 | 145 | 682 | 70.0 | 1.40 |
| C4 | 65.5 | 34.5 | 35.4 | 5.0 | 145 | 682 | 70.0 | 1.40 |
| C5 | 71.8 | 28.2 | 43.0 | 3.0 | 150 | 682 | 27.5 | 0.45 |

The inventive copolymers and the comparative samples produced under the conditions depicted in TABLE 3 were subjected to testing to verify the properties and characteristics of the copolymers. The various properties were tested using the test methodologies described, unless otherwise noted.

Ethylene Content and Triad Tacticity

The techniques for determining the ethylene and propylene ("PP") composition by NMR and the triad tacticity were performed in accordance with the techniques outlined in the aforementioned references. More particularly, samples were prepared by adding 0.4 g of the copolymer sample and 100 mg Cr(acac)$_3$ to a 4-dram vial, followed by 0.5 mL of orthodichlorobenzene-d4 and 3.5 mL of trichlorobenzene two minutes. Samples were then taken out of the press and quickly transferred from the hot metal plates to a set of room temperature plates with the 10 kg weight block on top to act as heat sink. Eight minutes of cooling time was applied before removing the weight block and metal plates. The films were then stored in a controlled temperature and humidity room (25° C., 50% RH) for 24 hours, and then cut using a dumbbell shape cutter based on ASTM-D412 die C.

Tensile Test

Tensile strength and elongation at break were determined at 20 in/min (51 cm/min) according to the procedure described in ASTM D412 (die C). All testing was performed by an MTS tensile tester in a temperature- and humidity-controlled (CTH) room at 25° C., 50% RH. Tensile strength at break was calculated by the force magnitude at break divided by cross-sectional area of unstrained specimen. Elongation at break was calculated by extended distance at break recorded and normalized by original normal gage length 62.5 mm within tensile grips.

TABLE 4, below, provides the measured characteristics and properties of measured copolymers. In addition, TABLE 4 also lists the characteristics and properties of two commercially available propylene-ethylene copolymers, which are labeled "CAC1" and "CAC2." In the following TABLES, "NP" refers to needle penetration, "SP" refers to the ring and ball softening point, "PP" refers to propylene, "TT" refers to triad tacticity, "TSB" refers to the tensile strength at break, "EB" refers to the elongation at break, "$H_F$" refers to heat of fusion, and "$H_C$" refers to heat of crystallization.

We have observed that the ethylene generally inserts into the copolymer mainly as crystal defects in the amorphous phase; thus, higher ethylene will typically interrupt the isotactic polypropylene (iPP) average crystal sequence length and decrease the percent of crystallinity of the copolymer. Generally, higher strength propylene-ethylene copolymers, such as those depicted in TABLES 3 and 4, will provide higher initial peel strengths in adhesives.

FIG. 1 is a chart comparing the propylene contents of the copolymers in TABLE 4 to the resulting tensile strengths at break. As shown in FIG. 1, the propylene and ethylene contents of the copolymers were critical when obtaining superior tensile strengths.

TABLE 4

| Sample | Vis. @ 190° C. (cP) | NP (dmm) | SP (° C.) | PP (Wt %) | Peak Tm (° C.) | TT (mm content %) | TSB (MPa) | EB (%) | $H_F$ (J/g) | $H_C$ (J/g) |
|---|---|---|---|---|---|---|---|---|---|---|
| 1A | 18350 | 13 | 115 | 80.8 | 86 | 55.3 | 3.8 | 582 | 12 | 18 |
| 1B | 20580 | 20 | 115 | 80.5 | 90 | 53.5 | 2.8 | 567 | 11 | 17 |
| 1C | 16900 | 17 | 111 | 78.9 | 84 | 54.4 | 2.9 | 517 | 12 | 16 |
| 1D | 25830 | 16 | 112 | 81.5 | 85 | 54.2 | 3.3 | 529 | 12 | 18 |
| 1E | 18150 | 19 | 105 | 79.9 | 80 | 57.6 | 3.4 | 569 | 13 | 18 |
| 1F | 23880 | 18 | 114 | 79.4 | 88 | 56.4 | 3.3 | 570 | 11 | 17 |
| 1G | 19650 | 13 | 110 | 81.9 | 87 | 58.5 | 6.0 | 621 | 12 | 21 |
| 1H | 87100 | 17 | 120 | 78.5 | 87 | 55.9 | 6.3 | 804 | 11 | 16 |
| 1I | 17540 | 11 | 113 | 83.5 | 94 | 62 | 7.5 | 634 | 13 | 23 |
| 1J | 15230 | 3 | 123 | 86.5 | 105 | 66.3 | 10.9 | 695 | 21 | 31 |
| 1K | 17480 | 5 | 128 | 87.8 | 111 | 68 | 12.3 | 735 | 29 | 34 |
| 1L | 15770 | 8 | 115 | 83.4 | 96 | 62.7 | 8.2 | 666 | 15 | 26 |
| 1M | 26250 | 7 | 116 | 83.8 | 94 | 62.7 | 9.5 | 722 | 15 | 25 |
| 1N | 23850 | 7 | 115 | 83.9 | 96 | 62.9 | 9.6 | 718 | 14 | 24 |
| 1O | 22630 | 8 | 117 | 85 | 96 | 63 | 9.3 | 706 | 14 | 26 |
| 1P | 28580 | 4.7 | 138 | 85.7 | 120 | 65.5 | 11.9 | 636 | 25 | 36 |
| 1Q | 60500 | 1 | 155 | 88.7 | 131 | 73.4 | 17.3 | 686 | 33 | 42 |
| C1 | 18170 | >100 | 122 | 60.0 | 105 | 25.5 | TS* | TS* | 2 | 2 |
| C2 | 19190 | 89 | 124 | 58.9 | 105 | 27.4 | TS* | TS* | 2 | 1 |
| C3 | 21200 | 74 | 101 | 64.6 | 106 | 33.9 | TS* | TS* | 1 | 1 |
| C4 | 23550 | 78 | 99 | 65.5 | 105 | 35.4 | TS* | TS* | 1 | 1 |
| C5 | 44600 | 47 | 119 | 71.8 | no peak | 43.0 | 0.2 | 163 | N/A | N/A |
| CAC1 | 18000 | 20 | 120 | 79 | — | N/A | 2.0 | 250 | N/A | N/A |
| CAC2 | 20000 | 25 | 143 | 92 | — | N/A | 0.7 | 288 | N/A | N/A |

TS* = samples were too soft to measure

As shown in TABLE 4, the inventive copolymers exhibited a desirable tensile strength (TSB) that was superior to comparative examples and to existing commercial products of similar viscosity. More particularly, as shown in above, the propylene/ethylene contents, the triad tacticity, viscosity, Peak $T_m$, heat of fusion, and heat of crystallization of the copolymers were all important characteristics in producing copolymers exhibiting superior tensile strength. For example, TABLE 4 highlights the importance of ethylene content, which can affect crystallinity and elongation of the copolymers, and triad tacticity, which can influence the tensile profile, elongation, crystallinity, and needle penetration of the resulting copolymers.

Example 2—Medium Viscosity Propylene-Ethylene Copolymers with High and Medium Tensile Strength Various inventive propylene-ethylene copolymers were produced that had a medium viscosity and exhibited a medium tensile strength. The propylene-ethylene copolymers were produced in accordance with the polymerization process described in Example 1.

The resulting inventive copolymers (e.g., "2A") and comparative copolymers (e.g., "C6") were produced in accordance with the reaction conditions listed in TABLE 5. The copolymers were subjected to testing to verify the properties and characteristics using the test methodologies previously described, unless otherwise noted.

TABLE 5

| Sample | Propylene (Wt %) | Ethylene (Wt %) | Triad Tacticity (mm content %) | Donor Ratio | Reactor Temp (° C.) | PP Flow (g/hr) | Ethylene Flow (g/hr) | H2 Flow (g/hr) |
|---|---|---|---|---|---|---|---|---|
| 2A | 79.8 | 20.2 | 57.6 | 3.0 | 130 | 682 | 80.0 | 1.68 |
| 2B | 81.5 | 18.5 | 58.3 | 3.0 | 145 | 682 | 71.0 | 1.15 |

TABLE 5-continued

| Sample | Propylene (Wt %) | Ethylene (Wt %) | Triad Tacticity (mm content %) | Donor Ratio | Reactor Temp (° C.) | PP Flow (g/hr) | Ethylene Flow (g/hr) | H2 Flow (g/hr) |
|---|---|---|---|---|---|---|---|---|
| 2C | 81.5 | 18.5 | 57.6 | 3.0 | 145 | 682 | 72.0 | 1.10 |
| 2D | 81.9 | 18.1 | 57.2 | 3.0 | 145 | 682 | 50.0 | 0.82 |
| 2E | 80.9 | 19.1 | 59.9 | 3.0 | 145 | 682 | 69.0 | 1.20 |
| 2F | 81.2 | 18.8 | 58.4 | 3.0 | 145 | 682 | 72.0 | 1.10 |
| 2G | 80.9 | 19.1 | 57.7 | 0.8 | 140 | 682 | 32.0 | 2.50 |
| 2H | 80.4 | 19.6 | 54.9 | 3.0 | 145 | 682 | 60.0 | 0.78 |
| 2I | 79.4 | 20.6 | 57.3 | 3.0 | 130 | 682 | 80.0 | 1.71 |
| 2J | 80.4 | 19.6 | 55.3 | 3.0 | 145 | 682 | 51.0 | 0.81 |
| 2K | 79.9 | 20.1 | 55.4 | 3.0 | 145 | 682 | 75.0 | 1.47 |
| 2L | 84.8 | 15.2 | 61.1 | 3.0 | 150 | 682 | 42.0 | 0.48 |
| 2M | 84.4 | 15.6 | 61.9 | 3.0 | 150 | 682 | 42.0 | 0.45 |
| 2N | 84.8 | 15.2 | 64.4 | 3.0 | 150 | 682 | 20.0 | 0.90 |
| 2O | 85.1 | 14.9 | 65.4 | 1.8 | 140 | 682 | 55.0 | 1.00 |
| 2P | 86.2 | 13.8 | 65.6 | 1.8 | 150 | 682 | 30.0 | 0.30 |
| C6 | 73.5 | 26.5 | 34.6 | 1.7 | 152 | 682 | 45.5 | 0.27 |
| C7 | 77.6 | 23.4 | 52.8 | 3.0 | 130 | 682 | 80.0 | 1.75 |
| C8 | 79.9 | 20.1 | 47.0 | 0.4 | 145 | 682 | 79.0 | 0.40 |
| C9 | 80.6 | 19.4 | 46.2 | 0.7 | 150 | 682 | 43.0 | 0.27 |

The inventive copolymers (i.e., samples beginning with a numeral) and the comparative samples (i.e., samples beginning with a "C") produced under the conditions depicted in TABLE 5 were subjected to testing to verify the properties and characteristics of the copolymers. The various properties were tested using the test methodologies described above, unless otherwise noted.

TABLE 6, below, provides the measured characteristics and properties of measured copolymers and of two commercially available propylene-ethylene copolymers with similar viscosities, which are labeled "CAC3" and "CAC4."

and ball softening point. For example, TABLE 6 highlights the importance of ethylene content, which can affect crystallinity and elongation of the copolymers, and triad tacticity, which can influence the tensile profile, elongation, crystallinity, and needle penetration of the resulting copolymers. Generally, higher strength propylene-ethylene copolymers, such as those depicted in TABLES 5 and 6, will provide higher initial peel strengths in adhesives.

Figure 2:
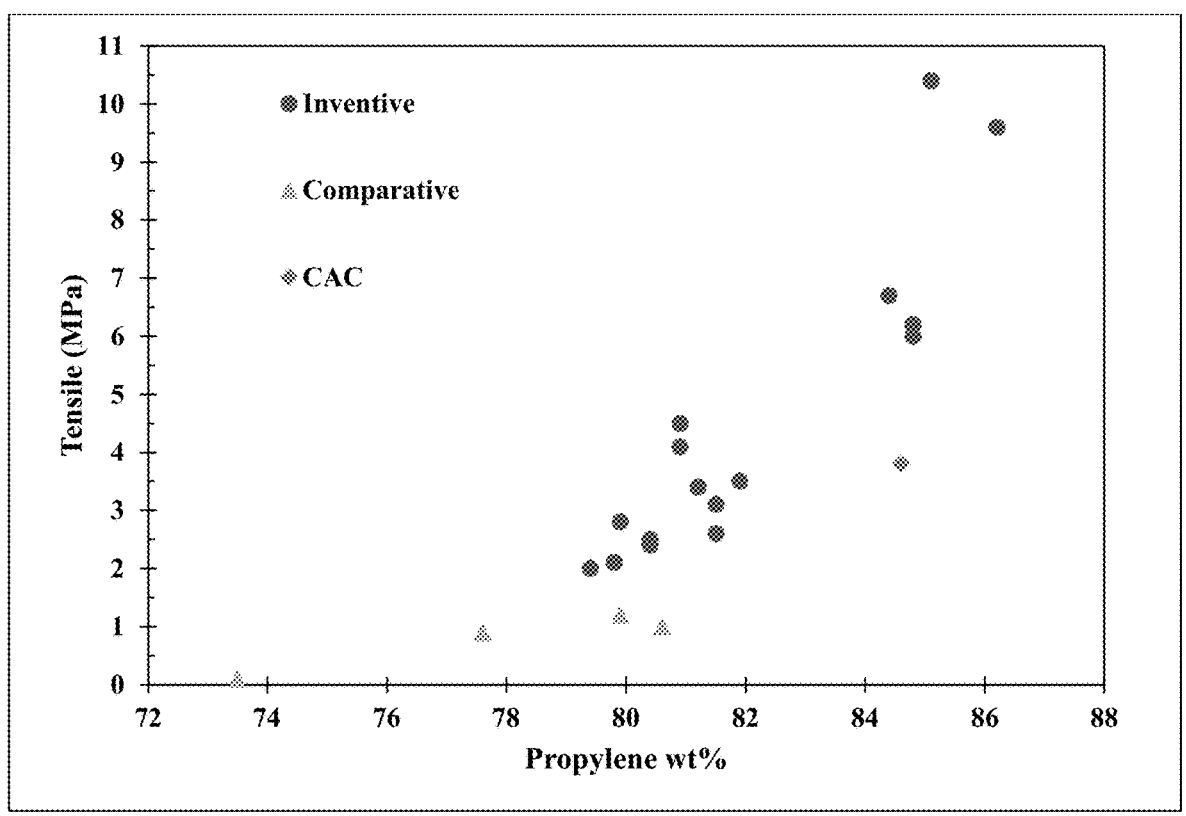
FIG. 2 is a graph comparing the propylene contents and the tensile strengths of the copolymers in Example 2.

FIG. 2 is a chart comparing the propylene contents of the copolymers in TABLE 6 to the resulting tensile strengths at break. As shown in FIG. 2, the propylene and ethylene

TABLE 6

| Sample | Vis. @ 190° C. (cP) | NP (dmm) | SP (° C.) | PP (Wt %) | Peak Tm (° C.) | TT (mm content %) | TSB (MPa) | EB (%) | HF (J/g) | Hc (J/g) |
|---|---|---|---|---|---|---|---|---|---|---|
| 2A | 9438 | 20 | 101 | 79.8 | 74 | 57.6 | 2.1 | 321 | 13 | 17 |
| 2B | 7917 | 16 | 106 | 81.5 | 82 | 58.3 | 3.1 | 365 | 12 | 19 |
| 2C | 7608 | 18 | 105 | 81.5 | 83 | 57.6 | 2.6 | 323 | 10 | 18 |
| 2D | 8075 | 16 | 108 | 81.9 | 85 | 57.2 | 3.5 | 429 | 13 | 19 |
| 2E | 7763 | 13 | 108 | 80.9 | 88 | 59.9 | 4.5 | 508 | 12 | 21 |
| 2F | 9700 | 14 | 107 | 81.2 | 83 | 58.4 | 3.4 | 458 | 14 | 19 |
| 2G | 11730 | 9 | 113 | 80.9 | 91 | 57.7 | 4.1 | 462 | 15 | 21 |
| 2H | 8638 | 19 | 108 | 80.4 | 85 | 54.9 | 2.5 | 309 | 12 | 17 |
| 2I | 9600 | 21 | 101 | 79.4 | 73 | 57.3 | 2.0 | 351 | 11 | 16 |
| 2J | 8788 | 20 | 105 | 80.4 | 81 | 55.3 | 2.4 | 346 | 11 | 18 |
| 2K | 11400 | 23 | 110 | 79.9 | 85 | 55.4 | 2.8 | 432 | 10 | 17 |
| 2L | 9212 | 8 | 115 | 84.8 | 96 | 61.1 | 6.2 | 538 | 17 | 26 |
| 2M | 10860 | 9 | 114 | 84.4 | 94 | 61.9 | 6.7 | 546 | 16 | 26 |
| 2N | 7758 | 5 | 118 | 84.8 | 102 | 64.4 | 6 | 420 | 14 | 23 |
| 2O | 8133 | 6 | 117 | 85.1 | 102 | 65.4 | 10.4 | 636 | 21 | 29 |
| 2P | 13656 | 5 | 124 | 86.2 | 105 | 65.6 | 9.6 | 681 | 18 | 29 |
| C6 | 9863 | 63 | 99 | 73.5 | 69 | 34.6 | 0.1 | 122 | 12 | 0 |
| C7 | 7408 | 29 | 95 | 77.6 | 74 | 52.8 | 0.9 | 128 | 3 | 4 |
| C8 | 8208 | 30 | 112 | 79.9 | 85 | 47.0 | 1.2 | 115 | 12 | 15 |
| C9 | 7642 | 29 | 113 | 80.6 | 90 | 46.2 | 1.0 | 91 | 9 | 14 |
| CAC3 | 6000 | 40 | 135 | N/A | N/A | N/A | 0.5 | 84 | 10 | 12 |
| CAC4 | 7570 | 16 | 111 | 84.6 | 100 | N/A | 3.8 | 1019 | 17 | 18 |

As shown above in TABLE 6, the inventive copolymers contained a higher viscosity and exhibited a desirable tensile strength that was superior to existing commercial products. More particularly, as shown in above, the propylene/ethylene contents, the triad tacticity, viscosity, Peak $T_m$, heat of fusion, and heat of crystallization of the copolymers were all important characteristics in producing copolymers exhibiting superior tensile strength and elongation at desirable ring contents of the copolymers were critical when obtaining superior tensile strengths. It is of particular interest to compare Inventive Example 2O and CAC4, which had similar viscosities and propylene contents. It is known that higher polymer molecular weight contributes to higher viscosity and tensile strength. It can be seen that the inventive example 2O has tensile strength (10.4 MPa, 8,133 cP) that is unexpectedly high for its viscosity, which is evident when compared to the values of CAC4 (i.e., 3.8 MPa, 7,570 cP). Without wishing to be bound by theory, the similar viscosity indicates a similar molecular weight, so the unexpectedly high tensile strength of Inventive Example 2O is possibly the result of the inventive combination of propylene content and tacticity (mm %).

Example 3—Low Viscosity Propylene-Ethylene Copolymers with High and Medium Tensile Strength Various inventive propylene-ethylene copolymers were produced that had a low viscosity and exhibited a medium tensile strength. The propylene-ethylene copolymers were produced in accordance with the polymerization process described in Example 1.

The resulting inventive copolymers (e.g., "3A") and comparative copolymers (e.g., "C11") were produced in accordance with the reaction conditions listed in TABLE 7, below. 3

TABLE 7

| Sample | Propylene (Wt %) | Ethylene (Wt %) | Triad Tacticity (mm content %) | Donor Ratio | Reactor Temp (° C.) | PP Flow (g/hr) | Ethylene Flow (g/hr) | H2 Flow (g/hr) |
|---|---|---|---|---|---|---|---|---|
| 3A | 80.2 | 19.8 | 56.6 | 3.0 | 130 | 682 | 80.0 | 2.10 |
| 3B | 81.7 | 18.3 | 58.4 | 3.0 | 145 | 682 | 70.0 | 1.40 |
| 3C | 82.2 | 17.8 | 58.1 | 4.0 | 145 | 682 | 70.0 | 1.40 |
| 3D | 80.9 | 19.1 | 55.5 | 3.0 | 145 | 682 | 70.0 | 1.40 |
| 3E | 85.0 | 15.0 | 65.6 | 1.8 | 140 | 682 | 55.0 | 1.00 |
| 3F | 85.1 | 14.9 | 65.6 | 1.8 | 140 | 682 | 55.0 | 1.00 |
| 3G | 85.3 | 14.7 | 65.6 | 1.8 | 140 | 682 | 55.0 | 1.00 |
| 3H | 86.7 | 13.3 | 66.8 | 1.8 | 140 | 682 | 55.0 | 1.00 |
| C10 | 76.7 | 23.3 | 49.4 | 4.0 | 145 | 682 | 70.0 | 1.40 |
| C11 | 80.1 | 19.9 | 51.1 | 0.5 | 150 | 682 | 80.0 | 0.30 |
| C12 | 74.8 | 25.2 | 44.7 | 3.0 | 145 | 682 | 40.0 | 1.20 |

The inventive copolymers (i.e., samples beginning with a numeral) and the comparative samples (i.e., samples beginning with a "C") produced under the conditions depicted in TABLE 7 were subjected to testing to verify the properties and characteristics of the copolymers. The various properties were tested using the test methodologies described above, unless otherwise noted. TABLE 8, below, provides the measured characteristics and properties of measured copolymers. In addition, TABLE 8 also lists the characteristics and properties of commercially available propylene-ethylene copolymers, which are listed as "CAC5," "CAC6," "CAC7," "CAC8," and "CAC9."

TABLE 8

| Sample | Vis. @ 190° C. (cP) | NP (dmm) | SP (° C.) | PP (Wt %) | Peak Tm (° C.) | TT (mm content %) | TSB (MPa) | EB (%) | HF (J/g) | Hc (J/g) |
|---|---|---|---|---|---|---|---|---|---|---|
| 3A | 5500 | 21 | 100 | 80.2 | 80 | 56.6 | 1.3 | 104 | 11 | 16 |
| 3B | 4025 | 17 | 102 | 81.7 | 84 | 58.4 | 2.3 | 102 | 13 | 21 |
| 3C | 5467 | 20 | 103 | 82.2 | 82 | 58.1 | 2.1 | 192 | 15 | 20 |
| 3D | 5175 | 22 | 102 | 80.9 | 78 | 55.5 | 1.5 | 113 | 11 | 17 |
| 3E | 4300 | 9 | 115 | 85 | 105 | 65.6 | 4.2 | 111 | 19 | 33 |
| 3F | 4775 | 10 | 117 | 85.1 | 97 | 65.6 | 5 | 250 | 16 | 27 |
| 3G | 5758 | 6 | 115 | 85.3 | 101 | 65.6 | 8.3 | 571 | 17 | 28 |
| 3H | 2083 | 7 | 120 | 86.7 | 121 | 66.8 | 4 | 1 | 28 | 39 |
| C10 | 5750 | 37 | 93 | 76.7 | 57 | 49.4 | 0.4 | 70 | 5 | 0 |
| C11 | 2,917 | 40 | 114 | 80.1 | 88 | 51.1 | 0.5 | 50 | 7 | 12 |
| C12 | 2,190 | 60 | 102 | 74.8 | 75 | 44.7 | too soft | too soft | 6 | 7 |
| CAC5 | 3,980 | N/A | N/A | 86 | N/A | N/A | 2.4 | 705 | N/A | N/A |
| CAC6 | 1,000 | 18 | 155 | 99 | N/A | N/A | 1.8 | 33 | N/A | N/A |
| CAC7 | 2,300 | 18 | 155 | 99 | N/A | N/A | 1.7 | 70 | N/A | N/A |
| CAC8 | 3,300 | 14 | 120 | 83 | N/A | N/A | 2.7 | 40 | N/A | N/A |
| CAC9 | 1,581 | 20 | 125 | 85 | N/A | N/A | 2.7 | 22 | N/A | N/A |

As shown in TABLE 8, the inventive copolymers have a low viscosity and exhibited a desirable tensile strength that was superior to existing commercial products. More particularly, as shown in above, the propylene/ethylene contents, the triad tacticity, viscosity, Peak $T_m$, heat of fusion, and heat of crystallization of the copolymers were all important characteristics in producing copolymers exhibiting superior tensile strength. For example, TABLE 8 highlights the importance of ethylene content, which can affect crystallinity and elongation of the copolymers, and triad tacticity, which can influence the tensile profile, elongation, crystallinity, and needle penetration of the resulting copolymers.

Figure 3:
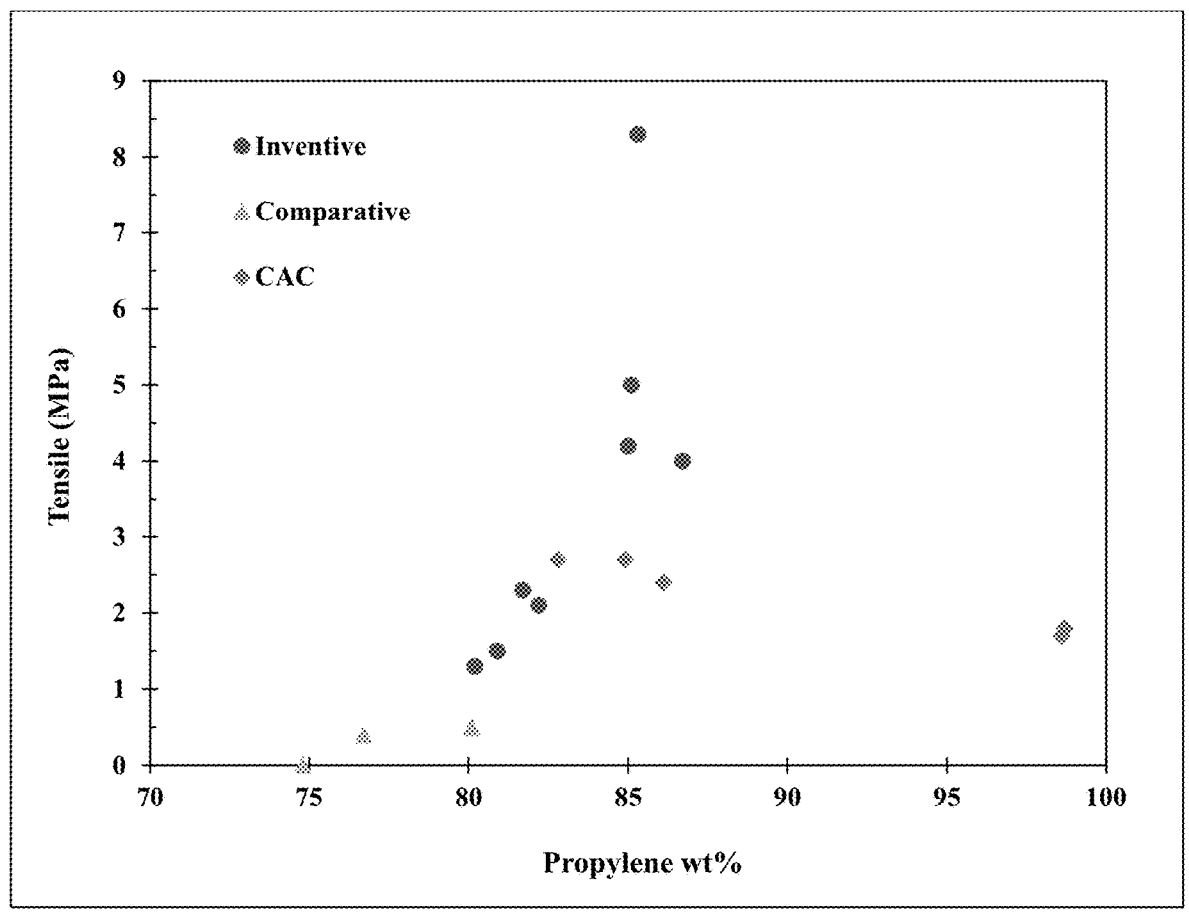
FIG. 3 is a graph comparing the propylene contents and the tensile strengths of the copolymers in Example 3.

FIG. 3 is a chart comparing the propylene contents of the copolymers in TABLE 6 to the resulting tensile strengths at break. As shown in FIG. 3, the propylene and ethylene contents of the copolymers were critical when obtaining superior tensile strengths. It is of particular interest to compare Inventive Examples 3E and 3F and CAC5. The Inventive Examples 3E and 3F have approximately twice the tensile strength (4.2 MPa and 5.0 MPa, respectively) of CAC5 (2.4 MPa), although the three copolymers have similar viscosities and propylene contents. Without wishing to be bound by theory, the similar viscosity indicates a similar molecular weight, so the unexpectedly high tensile strength of Inventive Examples 3E and 3F is possibly the result of the inventive combination of propylene contents and tacticity (mm %).

Figure 4:
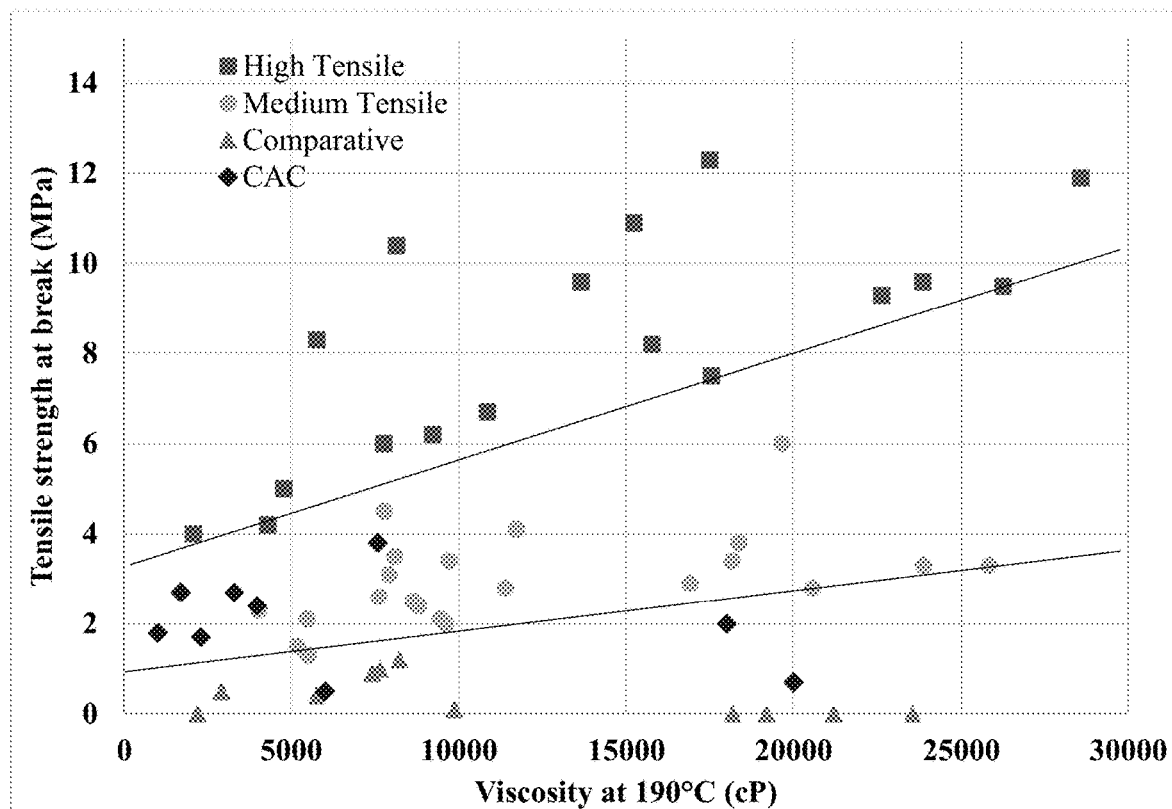
FIG. 4 is a graph comparing the viscosities and the tensile strengths of the copolymers from Examples 1-3.

FIG. 4 is a chart that compares the tensile strengths of all of the high tensile strength inventive copolymers and the medium tensile strength inventive copolymers with the viscosities of the corresponding copolymers. The copolymers in FIG. 4 include those from Examples 1-3, along with the comparative copolymers and the commercially available copolymers (CAC) noted above. As shown in FIG. 4, the viscosities of the inventive copolymers had a positive influence on the resulting tensile strengths of the copolymers.

Example 4—Woodworking Adhesives

Various hot melt adhesives for woodworking applications were produced to test the inventive copolymers. Inventive copolymers 1B, 1C, 1D, and 2N were used to produce woodworking adhesives having the formulations provided in TABLE 16. In addition, for comparison purposes, adhesive formulations were also produced using Aerafin™ 180 by Eastman and Vestoplast® 828 from Evonik Industries. Vestoplast® 828 has a viscosity at 190° C. of 25,000 cP, a needle penetration of 22 dmm, a softening point of 161° C., a Tm of 159° C., tensile strength at break of 0.9 MPa, an elongation at break of 468%, and heat of crystallization of 8.3 J/g. The adhesives also contained an antioxidant (Irganox® 1076 from BASF), a tackifier (Eastotac™ H100R from Eastman), and a wax (Epolene® E-43 from Westlake Chemical). All of the following amounts in TABLE 9 regarding the listed ingredients are provided in weight percentages, based on the total weight of the adhesive. The amount of antioxidant added was based on the total weight of the other ingredients.

The adhesives were made based on the following process. First, a heating block was preheated to about 180° C. Subsequently, the copolymer, wax, resin, and antioxidant were weighed into a pint aluminum container. The container was subsequently placed in the heating block. Once the mixture shows sign of melting, stirrer was inserted and mixed at a speed of about 50 rpm until it was homogeneous. Once the mixture was homogeneous, the speed of stirring was increased to 150 rpm for 30 minutes. Then the speed was lowered to ~30 rpm and left to mix for another 15 minutes before removal to remove bubbles (if any). Heating block temperature was maintained around 180° C. throughout the blending process. The adhesive was poured onto a silicon-coated release paper and cooled to room temperature.

TABLE 9 provides the formulation and property characteristics of the comparative woodworking adhesives ("CA") and Inventive Adhesives ("IA").

TABLE 9

| | CA 1 | CA 2 | IA 1 | IA 2 | IA 3 | IA 4 |
|---|---|---|---|---|---|---|
| Aerafin ™ 180 | 71 | | | | | |
| Vestoplast ™ 828 | | 71 | | | | |
| Copolymer 1B | | | 71 | | | |
| Copolymer 1C | | | | 71 | | |
| Copolymer 1D | | | | | 71 | |
| Copolymer 2N | | | | | | 71 |
| Eastotac H100R | 25 | 25 | 25 | 25 | 25 | 25 |
| Epolene E-43 | 4 | 4 | 4 | 4 | 4 | 4 |
| Irganox 1076 | 0.2 | 0.2 | 0.2 | 0.2 | 0.2 | 0.2 |
| Testing | | | | | | |
| Viscosity@190° C., cP | 8680 | 11275 | 9600 | 8030 | 12130 | 4302 |
| RBSP (° C.) | 136 | 155 | 135 | 135 | 135 | 131 |
| SAFT (° C.) | 93 | 92 | 87 | 81 | 84 | 87 |
| Lap shear, lbf | 99 | 106 | 109 | 98 | 107 | 212 |
| Heat resistance test, ° C. (Average) | 95 | 145 | 115 | 105 | 110 | 103 |

Viscosity Measurements of Adhesives

Viscosity was measured using a Brookfield DV2Textra viscometer equipped with a Thermosel™ and a #27 spindle following an internal method that conforms to ASTM D-3236. 10.5 grams of adhesive was placed in a Brookfield tube, and the sample was heated to temperature (if not molten) for 10 minutes. The sample was then allowed to equilibrate under shear for 20 minutes at each respective test temperature. Spindle rpm was adjusted to maximize motor % and no adjustments were made during the last 20 minutes of shear equilibration time. Values are reported in centipoise (cP). The viscosity readings were taken from low to high temperature.

Adhesive Ring and Ball Softening Point (RBSP)

Adhesive ring and ball softening point was measured using a Herzog ring and ball softening point apparatus following ASTM method E-28. Formulated adhesives were decanted into brass rings and allowed to cool overnight or more than 16 hours. Samples were trimmed flat before testing. Silicone oil was heated at 5° C. per minute until the ball passed through softened specimen, at which point the temperature was measured. Reported values are the average of two readings.

Shear Adhesion Failure Temperature (SAFT) —Woodworking

Sample preparation: Two birch wood substrates (size 1"×1") were bonded with the adhesive. The adhesive was melted at 180-200° C. for at least 20 minutes, then applied to one of surface of a birch wood substrate with a laboratory spatula. Immediately after, another birch wood substrate was placed on top of the adhesive with a gentle pressure to make sure 1"×1" of bond area. A 100 g weight was placed on top of the bond area for 30 seconds at 350° C. Final adhesive thickness was 1.5 to 2.0 mil.

SAFT temperature measurement followed ASTM D4498-07 "Standard Test Method for Heat-Fail Temperature in Shear of hot Melt Adhesives." After conditioning at room temperature for at least 24 hours, specimens were placed in a programmable oven with Cheminstruments 30-Bank tester (West Chester Township, OH). The static load was 500 g. The heating program was set to run from 20° C. to 150° C. at a ramp rate of 0.5° C./minute. The program recorded the time when the bonding failed (the weight dropped) and converted to the bonding failure temperature. A total of three specimens were tested and the average reported. Standard deviation was 6° C.

Lap Shear Strength Testing—Woodworking

Two birch wood panels were bonded with a 3±0.9 gram/m2 bead of adhesive applied at 190° C. using an Adhesive Testing Unit manufactured by ITW Dynatec GmbH, Mettmann, Germany. The samples were conditioned for 24 hours in a temperature- and humidity-controlled (CTH) room at 25C, 50% RH before testing. The strength was measured on an MTS Criterion Model 43 Electromechanical Universal Test System at a speed of 12.7 mm/min. A minimum of five specimens of each sample were tested and the average values were reported. The testing was done in accordance with ASTM D1002.

Heat Resistance—Woodworking

Heat resistance was measured using a 1"×8" MDF board and laminated paper substrates bonded with about 5 mil of adhesive that was pressed at 350° C. for 1.5 minutes. The laminates were mounted horizontally in an oven, and a 10 g weight was hung from the end of the paper laminate. The oven was set to 50° C. and the temperature was increased 10° C. every hour to a maximum of 150° C. The failure temperature was the temperature where the paper delaminated more than 7 cm from the MDF board. The average of three measurements was reported.

As shown in TABLE 9, all of the inventive adhesives exhibited a heat resistance greater than 100° C. In contrast, the CA1 only had a heat resistance of 95° C. Furthermore, Inventive Adhesive 4 exhibited an unexpected 114% increase in the lap shear strength relative to the Comparative Adhesive, while also providing a reduced viscosity. Most surprising, the increased heat resistance and lap shear of the Inventive Adhesives were accompanied by reduced SAFT temperatures.

Example 5—Woodworking Adhesives

Various hot melt adhesives for woodworking applications were produced to test the inventive copolymers. Inventive copolymers 1B, 1C, 1D, and 2N were used to produce woodworking adhesives having the formulations provided in TABLE 10, below. In addition, for comparison purposes, adhesive formulations were also produced using Aerafin™ 180 by Eastman and Vestoplast® 828 from Evonik Industries. The adhesives also contained an antioxidant (Irganox™ 1076 from BASF) and a tackifier (Eastotac™ H130R from Eastman). The adhesives were produced and tested according to the procedures previously described in Example 4. All of the following amounts in TABLE 10 regarding the listed ingredients are provided in weight percentages, based on the total weight of the adhesive. The amount of antioxidant added was based on the total weight of the other ingredients. TABLE 10 provides the formulation and property characteristics of the comparative woodworking adhesives ("CA") and Inventive Adhesives ("IA").

TABLE 10

| | CA 3 | CA 4 | IA 5 | IA 6 | IA 7 |
|---|---|---|---|---|---|
| Aerafin™ 180 | 75 | | | | |
| Vestoplast® 828 | | 75 | | | |
| Copolymer 1B | | | 75 | | |
| Copolymer 1C | | | | 75 | |
| Copolymer 1D | | | | | 75 |
| Eastotac H130R | 25 | 25 | 25 | 25 | 25 |
| Irganox 1076 | 0.2 | 0.2 | 0.2 | 0.2 | 0.2 |
| Viscosity@190° C., cP | 10527 | 15533 | 12300 | 9740 | 15130 |
| RBSP (° C.) | 111 | 156 | 108 | 105 | 106 |
| Lap shear, lbf | 83 | 92 | 70 | 72 | 66 |

As shown in TABLE 10, all of the inventive adhesives exhibited a desirable lap shear relative to the comparative adhesives. Additionally, the inventive adhesives exhibited lower RBSP, which enables faster melting and easier processing.

Example 6—Hygiene Adhesives with High Viscosity Propylene-Ethylene Copolymers

Various hot melt adhesives for hygiene applications were produced to test the inventive copolymers that had a high viscosity (i.e., 1A and 1I from Example 1). In addition, for comparison purposes, an adhesive formulation was also produced using Aerafin™ 180 by Eastman. The adhesives also contained an antioxidant (Irganox® 1010 from BASF), a tackifier (Eastotac™ H100R or Regalite™ R1090 from Eastman), a wax (Sasolwax® H-1 from Sasol), and a processing oil (Kaydol Oil from Chevron or Seration 1820 by Sasol). The adhesives were produced and tested according to the procedures described in Example 4, unless otherwise noted. All of the following amounts in TABLE 11 regarding the listed ingredients are provided in weight percentages, based on the total weight of the adhesive. The amount of antioxidant added was based on the total weight of the other ingredients. TABLE 11 provides the formulation and property characteristics of the comparative hygiene adhesive ("CA") and Inventive Adhesives ("IA").

TABLE 11

|  | Adhesive | High oil content | | Lower Oil Content | | | | |
|---|---|---|---|---|---|---|---|---|
|  |  | IA 8 | IA 9 | CA 5 | IA 10 | IA 11 | IA 12 | IA 13 |
| Formula | Copolymer Type | 1A | 1I | Aerafin 180 | 1A | 1A | 1I | 1I |
|  | Copolymer | 32 | 32 | 35 | 35 | 35 | 35 | 37.5 |
|  | Tackifier (H100R) | 48 | 48 | | | | | |
|  | Tackifier (R1090) | | | 46.5 | 46.5 | 46.5 | 46.5 | 49 |
|  | Kaydol Oil | 20 | 20 | 10.5 | 10.5 | 10.5 | 10.5 | 10.5 |
|  | H-1 Wax | | | 7 | 7 | | 7 | 2 |
|  | Seration 1820 | | | | | 7 | | |
|  | Antioxidant | 1 | 1 | 1 | 1 | 1 | 1 | 1 |
| Adhesive Data | Viscosity, cP | | | | | | | |
|  | 130° C. | 4387 | 4615 | 5517 | 4433 | 4417 | 4000 | — |
|  | 140° C. | 2940 | 3045 | 3625 | 2960 | 2988 | 2800 | — |
|  | 150° C. | 2090 | 2070 | 2583 | 2100 | 2077 | 1965 | 3000 |
|  | 160° C. | 1503 | 1547 | 1875 | 1538 | 1505 | 1435 | — |
| Performance Data | Line Speed and Coat weight | Signature nozzle; Peel strength/standard deviation | | | | | | |
|  | Instant Peel | | | | | | | |
|  | 150° C. @450 m/min; @3 gsm | 79/9 | 95/7 | 115/8 | 160/15 | 120/7 | 159/7 | 153/18 |
|  | 24 hours peel Line speed@150° C. @3 gsm | | | | | | | |
|  | 200 m/min | 86/10 | 85/4 | 122/6 | 144/11 | 157/18 | 167/13 | 73/17 |
|  | 450 m/min | — | — | — | 150/6 | — | — | — |
|  | 600 m/min | — | — | — | 146/8 | — | — | — |
|  | Peel strength (g/25 mm) | | | | | | | |
|  | 2 wks. @55° C. | — | — | 180/19 | 168/14 | 95/11 | 117/12 | — |
|  | 1 month @25° C. | 70/3 | 38/2 | 160/8 | 181/15 | 109/10 | 103/15 | — |

Nonwoven Laminate Peel Strength (T-Peel) Measurements

A polyethylene ("PE") backsheet with a thickness of 1 mil (24.4 gsm) from Berry Global and a non-woven hydrophobic fabric sheet with a thickness of 15 gsm from Midwest Filtration were adhered together using a Catbridge high speed coater as described below to form a laminate sample by applying the hot melt adhesive between the two sheets at 3 gsm via a Signature nozzle head between 130 to 160° C. The PE backsheet and the non-woven hydrophobic fabric sheet were peeled from one another at an angle of 180° and with a rate of 300 mm/min using an Instron 3365 tensile strength tester. Except for the Instant Peel strength, the laminates were conditioned at 25° C. and 50% relative humidity after the hot melt adhesive was applied and before peel testing. The following T-peel tests were carried out:

Instant Peel strength-g/25 mm
Peel strength-g/25 mm at 24 hrs;
Peel strength-g/25 mm at 4 hours at 38° C.;
Peel strength-g/25 mm at 2 weeks at 55° C.; and
Peel strength-g/25 mm at 1 month at 25° C.

The PE backsheet and the non-woven hydrophobic fabric sheet were pulled 6.5 inches apart and the force was recorded as the T-peel strength of the hot melt adhesive. A replicate of five specimens was carried out for each test and the average value/standard deviation were recorded.

Additionally, the adhesives depicted in TABLE 11 were subjected to further Catbridge trial runs in order to analyze the effects of oil contents on the peel strengths of the adhesives.

Catbridge Calibration and Run Steps

The Catbridge high speed coater (PL 59188) was fabricated by Catbridge Machinery and equipped with an Acumeter tank/pump and Nordson applicator with a signature nozzle. The Acumeter pump speed was calibrated based on three pump ratios controlled by the Catbridge, i.e., at 20%, 30% and 50%. Using a timer, the adhesive was dispensed onto tared release liner for one minute and weighed. The weights were used to plot a graph of weight versus pump speed. The equation with $R^2$ of higher than 0.98 was acceptable and the slope and constant were obtained. Depending on the line speed, add-on weight and pattern width, the amount of adhesives to be dispensed was determined using the following equation:

Amount of adhesives (g/min)=Line speed (m/min)×
add-on weight (g/m$^2$)×pattern width (m)

Using the slope and constant from the calibration, the pump ratio (%) and rpm of the pump speed were determined for the amount of adhesives needed. Catbridge was then run at the required pump speed by adjusting the air pressure to achieve a good adhesive pattern and good edge control. The adhesives were sprayed on the PE backsheet and combined with nonwovens at the nip roll that was set at 30 psi. The line was run for about 30-40 seconds to obtain good representative specimens as the line took a few seconds to stabilize. If the pattern was not good enough, i.e., not enough entanglement or fiberization when viewed under UV light, the air pressure was adjusted incrementally until a good pattern was achieved. Typically, a higher air pressure was needed for higher line speed or higher viscosity adhesives.

Figure 5:
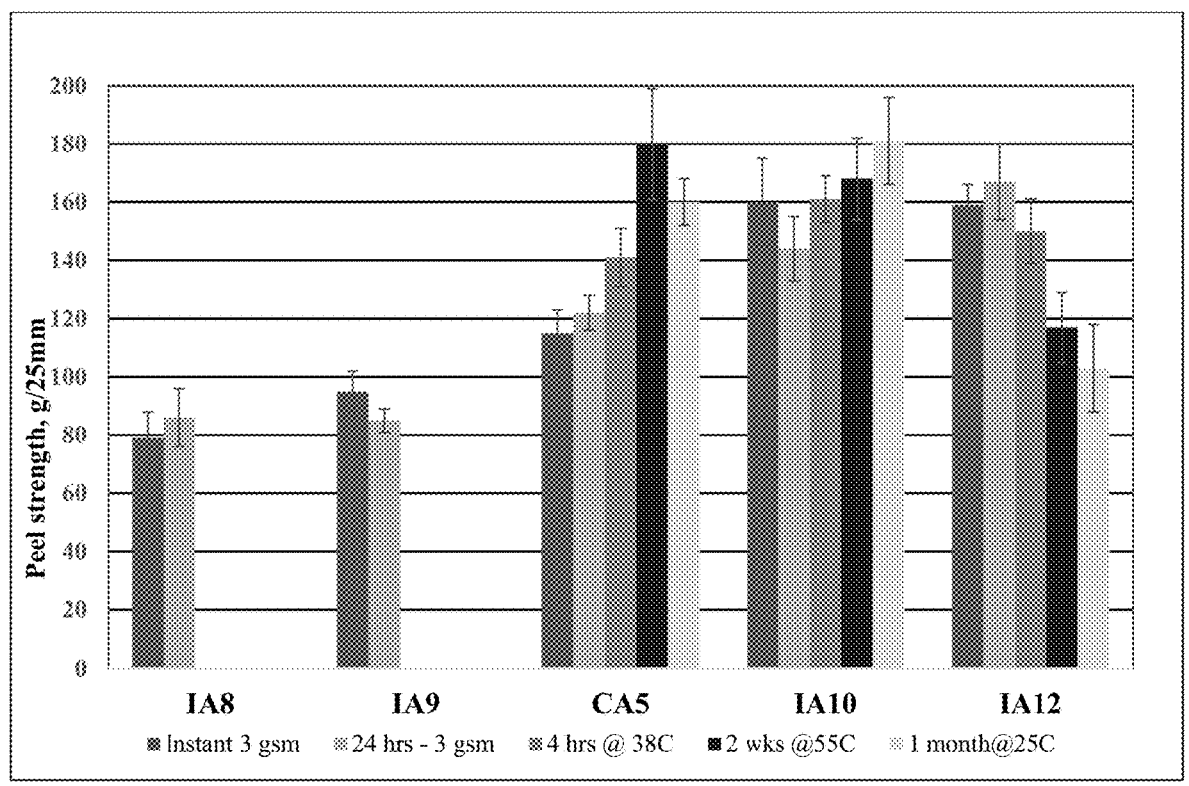
FIG. 5 depicts the peel strength values of the Catbridge trial runs for Example 6.

The results of the Catbridge trial runs for IA8, IA9, CA5, IA10, and IA12 are depicted in FIG. 5, which shows the instant peel strengths and the peel strengths at 24 hours, 4 hours (aged at 38° C.), at two weeks (aged at 55° C.), and one month (aged at 25° C.).

As shown above in TABLE 11, a polymer loading of 32 to 35 weight percent with a single copolymer type obtained the adhesive viscosity range for spraying. Furthermore, as shown in TABLE 11 and FIG. 5, the adhesives with lower oil contents were able to maintain higher peel strengths, which was aided by the tensile strength of the inventive copolymers. Furthermore, the adhesives formed from Inventive Copolymer 1A exhibited the best overall performance for all of the adhesives. In particular, it was found that the high viscosity copolymers could be used as the only polymer in an adhesive formulation with desirable RBSP, desirable viscosity at spraying temperatures from about 130° C. to about 160° C., desirable nonwoven/PE instant peel strength, and stable or increasing peel strengths at 24 hours, 4 hours (aged at 38° C.), at two weeks (aged at 55° C.), and one month (aged at 25° C.). Specific adhesives could contain 30 to 45 weight percent of the propylene-ethylene copolymer, 35 to 55 weight percent of at least one tackifier, 5 to 25 weight percent of a processing oil, and 0 to 15 weight percent of at least one wax.

Thus, it was found that a suitable range of propylene/ethylene comonomer content together with a specific level of propylene tacticity provided propylene-ethylene copolymers with a unique balance of medium tensile strength, viscosity, needle penetration, and elongation properties that were particularly advantageous for hygiene adhesive applications. More particularly, it was observed that the tensile strength of the inventive copolymers was high enough to contribute to adhesive bonding strength in formulated adhesives, yet not too high so that bonding strength would be significantly lost after aging. Furthermore, by maintaining a specific triad tacticity in the inventive copolymers, the tensile strength, elongation, crystallinity, and needle penetration of the resulting copolymers were able to form adhesives exhibiting superior aging properties.

Example 7—Hygiene Adhesives with Medium Viscosity Propylene-Ethylene Copolymers

Various hot melt adhesives for hygiene applications were produced in order to test the inventive copolymers from Example 2 that had a medium viscosity. In addition, for comparison purposes, adhesive formulations were also produced using Comparative Copolymers C8 and C9. The adhesives also contained an antioxidant (Irganox® 1010 from BASF), a tackifier (Eastotac™ H100R or Regalite™ R1090 from Eastman), a wax (Sasolwax® H-1 from Sasol), a possible additional propylene-ethylene copolymer (Eastoflex™ E1003 from Eastman), and a processing oil (Kaydol Oil from Chevron). Additionally, Inventive Adhesives IA 20 and IA 21 contained a small amount of one additional high viscosity copolymer, i.e., Kraton D1657 SEBS styrenic block copolymer from Kraton and INFUSE™ 9807 olefin block copolymer from Dow, respectively.

The adhesives were produced and tested according to the procedures described in Examples 4 and 6. All of the following amounts in TABLES 12 and 13 regarding the listed ingredients are provided in weight percentages, based on the total weight of the adhesive. TABLE 12, below, provides the formulation and property characteristics of the comparative hygiene adhesive ("CA") and Inventive Adhesives ("IA") having a high oil content, while TABLE 13, below, provides the formulation and property characteristics of the comparative hygiene adhesive ("CA") and Inventive Adhesives ("IA") having a low oil content.

TABLE 12

| | | High oil content | | | | | | | | | |
|---|---|---|---|---|---|---|---|---|---|---|---|
| | Adhesive | CA 6 | IA 14 | IA 15 | IA 16 | IA 17 | IA 18 | IA 19 | IA 20 | IA 21 | IA 22 |
| Formula | Primary Copolymer(s) | C8 | 2K | 2K | 2K | 2K | 2B | 2B | 2B | 2B | 2M |
| | High Vis. Copolymer | | | | | | | | 2 | 2 | |
| | Low Vis. Copolymer | 50 | 50 | 40 | 50 | 50 | 35 | 35 | 43 | 43 | 50 |
| | Tackifier (H100R) | 35 | 40 | 50 | 40 | 35 | 50 | 50 | 40 | 40 | 35 |
| | Eastoflex E1003 | | | | | | | 15 | | | |
| | Kaydol Oil | 15 | 10 | 10 | 10 | 15 | 15 | | 15 | 15 | 15 |
| | Antioxidant | 1 | 1 | 1 | 1 | 1 | 1 | 1 | 1 | 1 | 1 |
| Adhesive Data | Viscosity, cP | | | | | | | | | | |
| | 130° C. | — | 9137 | 10475 | 12900 | 9450 | 9083 | — | 7838 | 7512 | — |
| | 140° C. | — | 6457 | 5328 | 8190 | 6764 | 5517 | — | 5283 | 5106 | — |
| | 150° C. | 2500 | 4372 | 3700 | 5721 | 4693 | 4160 | — | 3780 | 3660 | — |
| | 160° C. | — | 3194 | 2665 | 4185 | 3462 | 2637 | — | 2737 | 2671 | — |
| Performance Data | Instant Peel | | | | Signature nozzle; Peel strength/standard deviation | | | | | | |
| | Coat weight@150° C. @450 m/min | | | | | | | | | | |
| | 2 gsm | 40 | 38 | 39/4 | 42 | — | — | — | — | — | — |
| | 2.5 gsm | 45 | 47/12 | 58/9 | 55/0 | 58/2 | — | — | — | — | — |
| | 3 gsm | 54/1 | 75/10 | 88/18 | 83/4 | — | 112/10 | 112/10 | 74/9 | 103/3 | 21/2 |
| | 24 hours peel | | | | | | | | | | |
| | Coat weight@150° C. @450 m/min | | | | | | | | | | |
| | 2 gsm | 61/7 | 48/11 | 46/4 | 52/7 | 36/9 | — | — | — | — | — |
| | 2.5 gsm | 62/4 | 55/10 | 61/2 | 71/6 | 65/3 | — | — | — | — | — |
| | 3 gsm | 80/8 | 89/10 | 82/5 | 88/7 | 78/5 | — | — | — | — | 23/3 |
| | Line speed @ 150° C. @3 gsm | | | | | | | | | | |
| | 200 m/min | 88/5 | 80/12 | 101/17 | 102/5 | 93/14 | 42/4 | 42/4 | 88/9 | 110/6 | 41/3 |
| | 600 m/min | 79/2 | 85/5 | 72/14 | 93/7 | 75/7 | — | — | — | — | — |

TABLE 12-continued

| | | High oil content | | | | | | | | |
|---|---|---|---|---|---|---|---|---|---|---|
| Adhesive | CA 6 | IA 14 | IA 15 | IA 16 | IA 17 | IA 18 | IA 19 | IA 20 | IA 21 | IA 22 |
| Peel strength/ (std dev (g/25 mm)) | | | | | | | | | | |
| 4 hrs. @38° C. | — | — | — | — | — | — | — | — | 138/11 | — |
| 2 wks. @55° C. | — | — | — | — | — | — | — | — | 107/11 | — |
| 1 month @25° C. | 90/8 | — | 69/8 | 90/7 | 73/5 | — | — | 72/3 | 112/9 | — |

TABLE 13

| | | Low Oil Content | | | | |
|---|---|---|---|---|---|---|
| | Adhesive | CA 7 | IA 23 | IA 24 | IA 25 | IA 26 |
| Formula | Primary Copolymer(s) | C9 | 2B | 2A | 2L | 2L |
| | Copolymer | 45 | 45 | 45 | 45 | 46.5 |
| | Tackifier (R1090) | 45 | 45 | 45 | 45 | 46.5 |
| | Kaydol Oil | 5 | 5 | 5 | 5 | 5 |
| | H-1 Wax | 5 | 5 | 5 | 5 | 2 |
| | AO | 1 | 1 | 1 | 1 | 1 |
| | Viscosity, cP | | | | | |
| | 130° C. | 4855 | 5425 | 5875 | 6030 | — |
| | 140° C. | 3315 | 3655 | 3992 | 4073 | — |
| | 150° C. | 2419 | 2605 | 2815 | 2882 | 3615 |
| | 160° C. | 1723 | 1905 | 2050 | 2105 | — |
| Performance Data | Instant Peel | | Signature nozzle; Peel strength/standard deviation | | | |
| | Coat weight@150° C. @450 m/min | | | | | |
| | 3 gsm | 125/4 | 165/6 | 146/11 | 147/23 | 98/13 |
| | 24 hours peel Line speed@150° C. @3 gsm | | | | | |
| | 200 m/min | 139/9 | 169/15 | 145/9 | 56/7 | 44/6 |
| | 450 m/min | — | — | 157/9 | — | — |
| | 600 m/min | — | — | 161/8 | — | — |
| | Peel strength/(std dev (g/25 mm)) | | | | | |
| | 4 hrs. @38° C. | 141/7 | 177/22 | 172/14 | — | — |
| | 2 wks. @55° C. | 140/6 | 119/6 | 143/8 | — | — |
| | 1 month @25° C. | 147/4 | 126/25 | 163/12 | — | — |

The adhesives depicted in TABLES 12 and 13 were subjected to Catbridge trial runs in order to analyze the effects of oil contents on the peel strengths of the adhesives. The results of the Catbridge trial runs for CA 6, IA 9, IA 20, IA 21, C 10, IA 23, IA 24, and IA 26 are depicted in FIG. 6, which shows the instant peel strengths and the peel strengths at 24 hours, 4 hours (38° C.), at two weeks (55° C.), and one month (25° C.).

Generally, medium viscosity olefin copolymers are not used as a sole polymer when producing adhesives because the cohesive strength is not good enough; however, as shown above in TABLES 12 and 13, the inventive copolymers having medium viscosities were able to produce desirable adhesives, both as the only polymer in the adhesive and as the primary polymer present in the adhesive. Additionally, the inventive adhesive formulations had desirable RBSP and viscosity, were able to be sprayed well at 150° C., and were able to demonstrate stable or increasing peel strength after ageing 24 hours, 4 hours (38° C.), two weeks (55° C.), and one month (25° C.). Generally, in order to get a higher polymer loading (e.g., 50 weight percent), a higher loading of oil was required to meet the viscosity required for adhesive spraying.

It was also observed using Eastoflex™ E1003 to replace some of the processing oil did not provide any advantage; rather it added a lot to the viscosity of the adhesive, thereby reducing the propylene-ethylene copolymer content, which negatively impacted the peel strength. It was also observed that adding higher viscosity copolymers, such as in IA 20 and IA 21, can maintain peel strength in the adhesive and tolerate higher amounts of processing oil. Generally, in order to use less processing oil, the copolymer content had to be lowered, such as in IA 23, IA 24, and IA 25. Consequently, in certain cases, this resulted in an increase in peel strength. For example, as shown in TABLE 13, IA 23 and IA 24 exhibited higher peel strengths relative to CA 7. However, the peel strength of IA 25 dropped by 60% on the next day and the adhesive was hard, which prevented it from completing the aging test. IA 24 also exhibited a softer touch, which can be desirable for hygiene applications.

Figure 6:
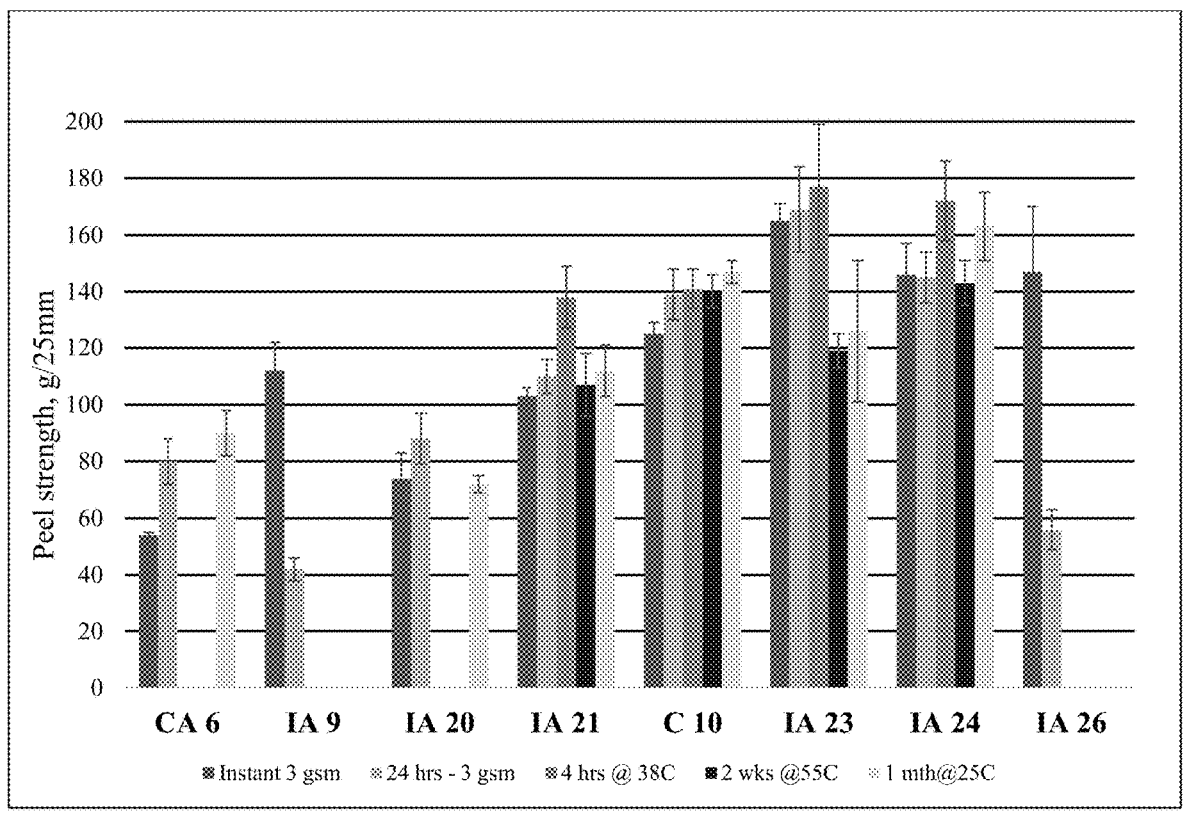
FIG. 6 depicts the peel strength values of the Catbridge trial runs for Example 7.

As shown in TABLES 12 and 13, along with FIG. 6, there is an advantage of using medium viscosity copolymers over low viscosity copolymers, as the medium viscosity inventive copolymers have better tensile properties and, therefore, may require less (or no) additional polymers to add strength. Furthermore, it has been demonstrated that medium tensile strength polymers, such as 2A, are well suited as single polymers in hygiene adhesives since they can provide excellent peel strength instantly, as well as after aging.

Example 8—Comparing Inventive Adhesives to Commercial Adhesives

Inventive Adhesive IA 10 from Example 6, Inventive Adhesive IA 23 from Example 7, and Inventive Adhesive IA 24 from Example 7 were compared to existing commercial adhesives, i.e., Safemelt™ DP830H/ST from Savare (SBS-based), 5603N2P from HB Fuller (mPO-based), and Safemelt™ VV25F/SW from Savare (butene-APO-based). The adhesives were tested according to the procedures described in Examples 4 and 6. TABLE 14, below, provides the property characteristics of the inventive adhesives and the commercial adhesives.

The adhesives depicted in TABLE 14 were subjected to Catbridge trial runs in order to analyze and compare the peel strengths of the adhesives. The results of the Catbridge trial runs are depicted in FIG. 7, which shows the peel strengths at 24 hours, 4 hours (38° C.), at two weeks (55° C.), and one month (25° C.).

Figure 7:
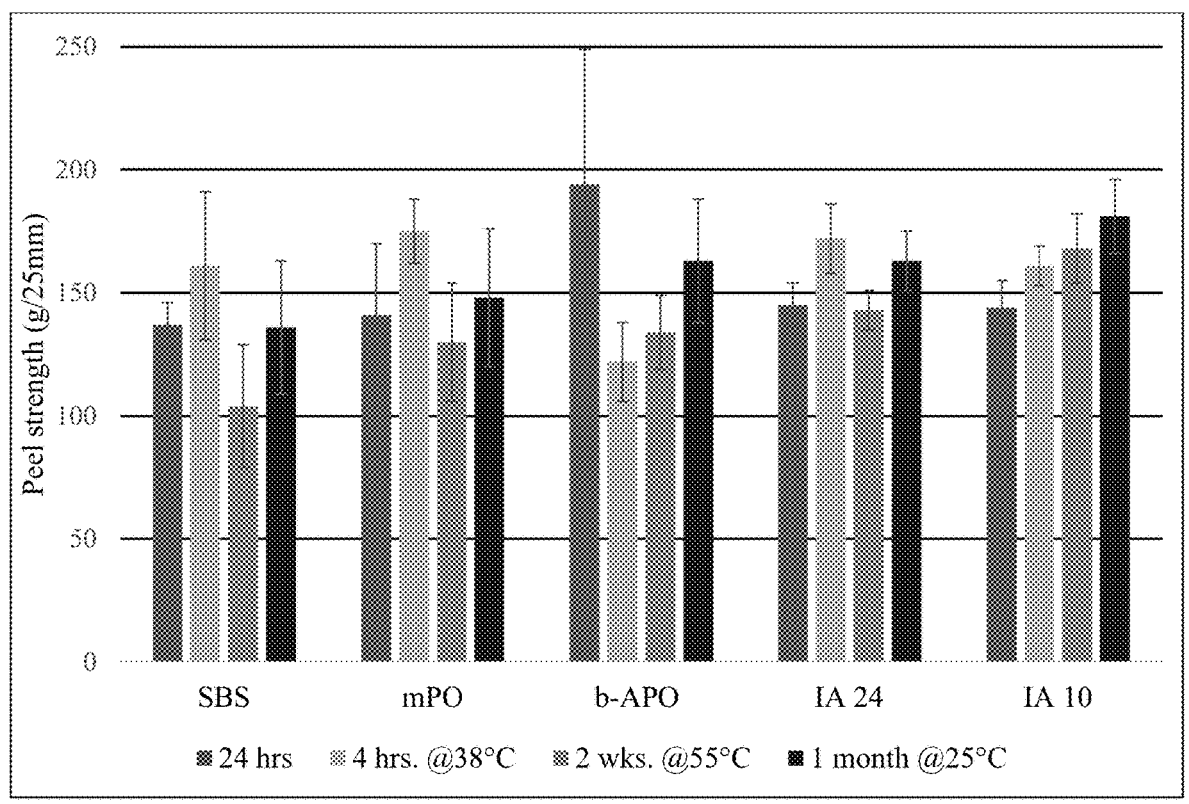
FIG. 7 depicts the peel strength values of the Catbridge trial runs for Example 8.

As shown in TABLE 14, along with FIG. 7, the inventive copolymers were suited as single polymers in producing hygiene adhesives that exhibited excellent peel strength, particularly after aging. Furthermore, the peel strength performance of the inventive adhesives was comparable to commercial adhesives in the present market. Moreover, the inventive adhesives sprayed very well and did not require high air pressure to get a good pattern; in contrast, the commercial butene-APO-based adhesive did not spray well at low temperatures and required high air pressure to get a good pattern. Additionally, the inventive adhesives exhibited enough cohesive strength to run at a high-speed line up to 600 m/min.

In view of the foregoing, it was observed that there was a direct correlation between the mechanical properties of the propylene-ethylene copolymers and the peel strengths of the adhesives. However, too high of a tensile strength was observed to cause the peel strength to drop upon aging.

TABLE 14

| | | Commercial Adhesives | | | Medium Visc. Copolymers | | High Visc. Copolymers |
|---|---|---|---|---|---|---|---|
| | Adhesive | DP830H/ST | 5603N2P | VV25F/SW | IA 23 | IA 24 | IA 10 |
| | Inventive Copolymer | | | | 2B | 2A | 1A |
| | Copolymer | | | | 45 | 45 | 35 |
| | Tackifier (R1090) | | | | 45 | 45 | 46.5 |
| | Kaydol Oil | | | | 5 | 5 | 10.5 |
| | H-1 Wax | | | | 5 | 5 | 7 |
| | AO | | | | 1 | 1 | 1 |
| Adhesive Data | Viscosity, cP | | | | | | |
| | 130° C. | 6858 | 6883 | 10021 | 5425 | 5875 | 4433 |
| | 140° C. | 4195 | 4940 | 6558 | 3655 | 3992 | 2960 |
| | 150° C. | 2883 | 3416 | 4580 | 2605 | 2815 | 2104 |
| | 160° C. | 2040 | 2487 | 3304 | 1905 | 2050 | 1538 |
| Performance Data | Instant Peel | Signature nozzle; Peel strength/standard deviation | | | | | |
| | Coat weight @ 150° C. @, 450 m/min | | | | | | |
| | 2 gsm | — | — | 104/13 | — | — | — |
| | 2.5 gsm | 107/5 | 92/13 | 123/4 | — | — | — |
| | 3 gsm | — | — | 151/16 | 165/6 | 146/11 | 160/15 |
| | 24 hours peel Coat weight @ 150° C. @ 450 m/min | | | | | | |
| | 2 gsm | 79/17 | 80/12 | 125/11 | — | — | — |
| | 2.5 gsm | 104/21 | 114/5 | 142/21 | — | — | — |
| | 3 gsm | 137/9 | 141/29 | 194/55 | — | — | — |
| | Line speed @ 150° C. @ 3 gsm | | | | | | |
| | 200 m/min | 40/7 | 119/9 | 129/10 | 169/15 | 145/9 | 144/11 |
| | 450 m/min | — | — | Would not spray | — | 157/9 | 150/6 |
| | 600 m/min | 128/19 | 121/6 | 120/11 | — | 161/8 | 146/8 |
| | Peel strength (g/25 mm) | | | | | | |
| | 4 hrs. @38° C. | 161/30 | 175/13 | 122/16 | 177/22 | 172/14 | 161/8 |
| | 2 wks. @55° C. | 104/25 | 130/24 | 134/15 | 119/6 | 143/8 | 168/14 |
| | 1 month @25° C. | 136/27 | 148/28 | 163/25 | 126/25 | 163/12 | 181/15 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "about" refers to any value in the range of 90% to 110% of the specified value. However, it should be noted that all values associated with "about" include support of the specific value itself and the range associated with "about" the specific value. For example, "about 10" provides support for a specific value of "10" and a value ranging from 9 to 11. Furthermore, the term "about" may be associated with any specific value recited herein.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the phrase "at least a portion" includes at least a portion and up to and including the entire amount or time period.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

When a numerical sequence is indicated, it is to be understood that each number is modified the same as the first number or last number in the numerical sequence or in the sentence. For example, each number is "at least," or not more than," as the case may be and each number is in an "or" relationship. In an exemplary scenario, "at least 10, 20, 30, 40, 50, 75 weight percent . . . " means the same as "at least 10 weight percent, or at least 20 weight percent, or at least 30 weight percent, or at least 40 weight percent, or at least 50 weight percent, or at least 75 weight percent."

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims. Furthermore, although specific embodiments of the invention are discussed, the invention covers any combination of those embodiments.

What is claimed is:

1. A propylene-ethylene copolymer comprising propylene and ethylene; wherein the propylene-ethylene copolymer:
    (a) comprises 77 to 90 weight percent of propylene;
    (b) comprises a triad tacticity (mm %) of 52% to 75%;
    (c) exhibits a Ring and Ball softening point of 90° C. to 135° C.;
    (d) has a Brookfield viscosity at 190° C. of 7,000 to 15,000 cP; and
    (e) exhibits a tensile strength at break of at least 2 MPa.
2. The propylene-ethylene copolymer according to claim 1, wherein the propylene-ethylene copolymer comprises 10 to 23 weight percent of ethylene.
3. The propylene-ethylene copolymer according to claim 1, wherein the triad tacticity of the propylene-ethylene copolymer is 54% to 68%.
4. The propylene-ethylene copolymer according to claim 1, wherein the tensile strength at break is 2 to 15 MPa.
5. The propylene-ethylene copolymer according to claim 1, wherein the propylene-ethylene copolymer exhibits a heat of crystallization of 16 to 29 J/g and a heat of fusion of 10 to 21 J/g.
6. The propylene-ethylene copolymer according to claim 1, wherein the propylene-ethylene copolymer exhibits a Ring and Ball softening point of 100 to 125° C. and a needle penetration of 5 to 23 dmm.
7. The propylene-ethylene copolymer according to claim 1, wherein the propylene-ethylene copolymer exhibits an elongation at break of 200% to 1,000% and a tensile strength at break of 2 to 12 MPa.
8. The propylene-ethylene copolymer according to claim 1, wherein the propylene-ethylene copolymer:
    (a) comprises 10 to 23 weight percent of ethylene,
    (b) comprises a triad tacticity (mm %) of 54% to 68%,
    (c) exhibits a Ring and Ball softening point of 100° C. to 135° C.; and
    (d) exhibits an elongation at break of 200% to 1,000%.
9. The propylene-ethylene copolymer according to claim 1, wherein the propylene-ethylene copolymer comprises less than 1 weight percent of a $C_4$-$C_{10}$ alpha-olefin.
10. A composition comprising the propylene-ethylene copolymer of claim 1.
11. A method for producing the propylene-ethylene copolymer of claim 1, wherein the method comprises polymerizing ethylene and propylene at a temperature equal to or less than 160° C., wherein the polymerizing occurs in presence of a catalyst system wherein said catalyst system has a molar ratio of aluminum to titanium in the range of 1:1 to 100:1.
12. An article comprising the propylene-ethylene copolymer of claim 1, wherein the article is selected from the group consisting of adhesives, sealants, caulks, roofing membranes, waterproof membranes and underlayments, carpet, laminates, laminated articles, tapes, labels, mastics, polymer blends, wire coatings, molded articles, heat seal coatings, disposable hygiene articles, insulating glass (IG) units, bridge decking, electronic housings, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, book bindings, candles, windows, tires, films, gaskets, seals, o-rings, motor vehicles, motor bicycles, motor vehicle molded parts, motor vehicle extruded parts, clothing articles, rubber additive/processing aids, and fibers, wherein the adhesives comprise packaging adhesives, food contact grade adhesives, indirect food contact packaging adhesives, product assembly adhesives, woodworking adhesives, edge banding adhesives, profile wrapping adhesives, flooring adhesives, automotive assembly adhesives, structural adhesives, flexible laminating adhesives, rigid laminating adhesives, flexible film adhesives, flexible packaging adhesives, home repair adhesives, industrial adhesives, construction adhesives, furniture adhesives, mattress adhesives, pressure sensitive adhesives (PSA), PSA tapes, PSA labels, PSA protective films, self-adhesive films, laminating adhesives, flexible packaging adhesives, heat seal adhesives, industrial adhesives, hygiene nonwoven construction adhesives, hygiene core integrity adhesives, or hygiene elastic attachment adhesives.

13. A composition comprising a propylene-ethylene copolymer containing propylene and ethylene; wherein the composition comprises:
   (a) 5 to 100 weight percent of the propylene-ethylene copolymer, wherein the propylene-ethylene copolymer—
      (i) comprises 77 to 90 weight percent of propylene,
      (ii) comprises a triad tacticity (mm %) of 52% to 75%;
      (iii) exhibits a Ring and Ball softening point of at least 90° C. to 135° C.,
      (iv) has a Brookfield viscosity at 190° C. of 7,000 to 15,000 cP, and
      (v) exhibits a tensile strength at break of at least 2 MPa;
   (b) 0 to 55 weight percent of at least one second polymer;
   (c) not more than 70 weight percent of at least one tackifier;
   (d) not more than 20 weight percent of a processing oil; and
   (e) not more than 35 weight percent of at least one wax.

14. The composition according to claim 13, wherein the propylene-ethylene copolymer comprises 10 to 23 weight percent of ethylene.

15. The composition according to claim 13, wherein the triad tacticity of the propylene-ethylene copolymer is 54% to 68%.

16. The composition according to claim 13, wherein the tensile strength at break is 2 to 15 MPa.

17. The composition according to claim 13, wherein the propylene-ethylene copolymer exhibits a heat of crystallization of 16 to 29 J/g and a heat of fusion of 10 to 21 J/g.

18. The composition according to claim 13, wherein the propylene-ethylene copolymer exhibits a Ring and Ball softening point of 100 to 135° C. and a needle penetration of 5 to 23 dmm.

19. The composition according to claim 13, wherein the propylene-ethylene copolymer exhibits an elongation at break of 200% to 1,000% and a tensile strength at break of 2 to 12 MPa.

20. The composition according to claim 13, wherein the composition comprises 20 to 80 weight percent of the propylene-ethylene copolymer.

21. The composition of claim 13, wherein the composition has a Brookfield viscosity at 150° C. in the range of 1,500 to 4,000 cP.

22. The composition according to claim 13, wherein the composition comprises:
   (a) 35 to 50 weight percent of the propylene-ethylene copolymer;
   (b) 0 to 15 weight percent of the second polymer;
   (c) 35 to 50 weight percent of the tackifier;
   (d) 0 to 15 weight percent of the processing oil; and
   (e) 0 to 10 weight percent of the wax.

23. The composition according to claim 13, wherein the composition comprises:
   (a) 35 to 55 weight percent of the propylene-ethylene copolymer;
   (b) 35 to 55 weight percent of the tackifier;
   (c) 0 to 15 weight percent of the processing oil; and
   (d) 0 to 7 weight percent of the wax.

24. The composition according to claim 13, wherein the composition exhibits a peel strength after 24 hours of aging that is at least 80 percent of an initial peel strength of the composition.

25. An article comprising the composition of claim 13, wherein the article is selected from the group consisting of adhesives, sealants, caulks, roofing membranes, waterproof membranes and underlayments, carpet, laminates, laminated articles, tapes, labels, mastics, polymer blends, wire coatings, molded articles, heat seal coatings, disposable hygiene articles, insulating glass (IG) units, bridge decking, electronic housings, water proofing membranes, waterproofing compounds, underlayments, cable flooding/filling compounds, sheet molded compounds, dough molded compounds, overmolded compounds, rubber compounds, polyester composites, glass composites, fiberglass reinforced plastics, wood-plastic composites, polyacrylic blended compounds, lost-wax precision castings, investment casting wax compositions, book bindings, candles, windows, tires, films, gaskets, seals, o-rings, motor vehicles, motor bicycles, motor vehicle molded parts, motor vehicle extruded parts, clothing articles, rubber additive/processing aids, and fibers, wherein the adhesives comprise packaging adhesives, food contact grade adhesives, indirect food contact packaging adhesives, product assembly adhesives, woodworking adhesives, edge banding adhesives, profile wrapping adhesives, flooring adhesives, automotive assembly adhesives, structural adhesives, flexible laminating adhesives, rigid laminating adhesives, flexible film adhesives, flexible packaging adhesives, home repair adhesives, industrial adhesives, construction adhesives, furniture adhesives, mattress adhesives, pressure sensitive adhesives (PSA), PSA tapes, PSA labels, PSA protective films, self-adhesive films, laminating adhesives, flexible packaging adhesives, heat seal adhesives, industrial adhesives, hygiene nonwoven construction adhesives, hygiene core integrity adhesives, or hygiene elastic attachment adhesives.

\* \* \* \* \*